United States Patent
Noi et al.

(10) Patent No.: US 9,660,270 B2
(45) Date of Patent: May 23, 2017

(54) METHOD FOR PRODUCING GARNET-TYPE COMPOUND, GARNET-TYPE COMPOUND, AND ALL-SOLID LITHIUM SECONDARY CELL CONTAINING SAID GARNET-TYPE COMPOUND

(71) Applicant: DAIICHI KIGENSO KAGAKU KOGYO CO., LTD., Osaka-shi, Osaka (JP)

(72) Inventors: Kousuke Noi, Osaka (JP); Sadahiro Yagishita, Osaka (JP)

(73) Assignee: DAIICHI KIGENSO KAGAKU KOGYO CO., LTD., Osaka (JP)

( * ) Notice: Subject to any disclaimer, the term of this patent is extended or adjusted under 35 U.S.C. 154(b) by 0 days.

(21) Appl. No.: 15/306,436

(22) PCT Filed: Apr. 9, 2015

(86) PCT No.: PCT/JP2015/061052
§ 371 (c)(1),
(2) Date: Oct. 24, 2016

(87) PCT Pub. No.: WO2015/163152
PCT Pub. Date: Oct. 29, 2015

(65) Prior Publication Data
US 2017/0047589 A1    Feb. 16, 2017

(30) Foreign Application Priority Data

Apr. 24, 2014 (JP) ................. 2014-090518

(51) Int. Cl.
| | | |
|---|---|---|
| H01M 4/62 | (2006.01) |
| H01M 10/0562 | (2010.01) |
| C01G 25/00 | (2006.01) |
| C01G 27/00 | (2006.01) |
| C01G 33/00 | (2006.01) |
| H01M 10/052 | (2010.01) |
| H01M 10/0525 | (2010.01) |

(52) U.S. Cl.
CPC .............. *H01M 4/62* (2013.01); *C01G 25/00* (2013.01); *C01G 25/006* (2013.01); *C01G 27/00* (2013.01); *C01G 33/00* (2013.01); *C01G 33/006* (2013.01); *H01M 10/052* (2013.01); *H01M 10/0525* (2013.01); *H01M 10/0562* (2013.01); *C01P 2002/72* (2013.01); *C01P 2004/03* (2013.01); *C01P 2006/40* (2013.01); *H01M 2300/0071* (2013.01)

(58) Field of Classification Search
CPC .............. H01M 4/624; C01G 25/006
See application file for complete search history.

(56) References Cited

U.S. PATENT DOCUMENTS

| | | | |
|---|---|---|---|
| 2010/0047696 A1 | 2/2010 | Yoshida et al. | |
| 2010/0203383 A1 | 8/2010 | Weppner | |
| 2013/0084505 A1 | 4/2013 | Iriyama et al. | |
| 2013/0344416 A1* | 12/2013 | Sakamoto ......... | H01M 10/0562 |
| | | | 429/495 |
| 2014/0205910 A1 | 7/2014 | Weppner et al. | |
| 2014/0295287 A1 | 10/2014 | Eisele et al. | |
| 2014/0377665 A1 | 12/2014 | Yoshida et al. | |

FOREIGN PATENT DOCUMENTS

| | | |
|---|---|---|
| JP | 2010-202499 A | 9/2010 |
| JP | 2010-534383 A | 11/2010 |
| JP | 2011-51800 A | 3/2011 |
| JP | 2011-195373 A | 10/2011 |
| JP | 2012-18792 A | 1/2012 |
| JP | 2012-224520 A | 11/2012 |
| JP | 2013-134852 A | 7/2013 |

(Continued)

OTHER PUBLICATIONS

Murugan et al., "Fast Lithium Ion conduction in Garnet-Type Li7La3Zr2O12", Angew. Chem. Int. Ed. pp. 7778-7781, vol. 46, 2007.
Thangadurai et al., "Novel Fast Lithium Ion Conduction in Garnet-Type Li5La3M2O12 (M=Nb, Ta)", Journal of the American Ceramic Society (J. Am. Ceram. Soc.), vol. 86, pp. 437-440, 2003.
International Search Report dated Jul. 7, 2015, issued in counterpart International Application No. PCT/JP2015/061052 (2 pages).

(Continued)

*Primary Examiner* — Peter F Godenschwager
(74) *Attorney, Agent, or Firm* — Westerman, Hattori, Daniels & Adrian, LLP

(57) ABSTRACT

The present invention provides a production method that can produce a garnet-type compound containing zirconium and lithium, the compound being in the form of fine particles, with high productivity. The method produces a garnet-type compound containing Zr, Li, and element $M^1$ (wherein $M^1$ is at least one element selected from the group consisting of La, Sc, Y, and Ce) as constituent elements. The method includes a first step of (1) mixing a first raw material and a second raw material to obtain a precipitate, the first raw material being a solution containing a zirconium carbonate complex and having a pH of at least 7.0 and not more than 9.5, and the second raw material containing a compound containing the above element $M^1$ as a constituent element; and (2) a second step of mixing the precipitate and a third raw material containing Li as a constituent element to obtain a mixture, and then firing the mixture at a temperature of less than 1,000° C. to obtain a fired product. The first raw material is prepared by mixing, at a prescribed molar ratio, at least a compound that contains a carbonate species and a compound that contains a zirconium species.

5 Claims, 6 Drawing Sheets

(56) References Cited

FOREIGN PATENT DOCUMENTS

| JP | 2013-184848 A | 9/2013 |
| JP | 5828992 B1 | 12/2015 |
| WO | 2010/090301 A1 | 8/2010 |
| WO | 2013/010692 A1 | 1/2013 |

OTHER PUBLICATIONS

Written Opinion of the International Searching Authority dated Jul. 7, 2015, issued in counterpart International Application No. PCT/JP2015/061052 (4 pages).

\* cited by examiner

METHOD FOR PRODUCING GARNET-TYPE COMPOUND, GARNET-TYPE COMPOUND, AND ALL-SOLID LITHIUM SECONDARY CELL CONTAINING SAID GARNET-TYPE COMPOUND

TECHNICAL FIELD

The present invention relates to a method for producing a garnet-type compound for use in all-solid lithium secondary batteries and the like, a garnet-type compound obtained by the method, and a secondary battery comprising the garnet-type compound.

BACKGROUND ART

Garnet is a cubic silicate mineral represented by the chemical composition $M^{2+}{}_3M^{3+}{}_2Si_3O_{12}$ (wherein $M^{2+}$ is Mg, Ca, Mn, or Fe, and $M^{3+}$ is Al, Cr, or Fe). Garnet-type compounds having crystal structures similar to the structure of garnet are not limited to silicates, but all of the $M^{2+}$, $M^{3+}$, $Si^{4+}$ ion positions in the crystal structure can be replaced with ions of various valencies. Accordingly, various garnet-type compounds having a structure similar to that of garnet exist. Among chemically synthesized garnet-type compounds, some are widely used in industry. An example of a well-known chemically synthesized garnet-type compound is yttrium aluminum garnet ($Y_3Al_2Al_3O_{12}$), which is widely used as an industrial laser material. Yttrium iron garnet ($Y_3Fe_2Fe_3O_{12}$) is used as a magnetic material or a faraday rotor.

In recent years, a specific garnet-type compound has been attracting attention as a potential material that could contribute to the development of the battery industry. The start of this was Non-patent Literature (NPL) 1, which reports that a synthesized garnet-type compound $Li_5La_3M_2O_{12}$ (wherein M is Nb or Ta) is a solid electrolyte material having remarkable lithium ion conductivity and Non-patent Literature (NPL) 2, which reports that another garnet-type compound $Li_7La_3Zr_2O_{12}$ (hereinafter abbreviated as "LLZ") is a solid electrolyte material having remarkable lithium ion conductivity. These compounds contain an excess of Li, compared with an ideal garnet-type structure. Having this specific crystal structure is considered to be one of the reasons why these compounds exhibit high lithium ion conductivity in a solid state. In particular, LLZ containing Zr as a component has a high lithium ion conductivity of $10^{-4}$ S/cm at room temperature.

Further, techniques are proposed regarding compounds analogous to LLZ, which are produced by adding various additional elements to LLZ and also have a garnet-type structure (see, for example, PTL 1 and PTL 2). Compared to normal LLZ, such compounds analogous to LLZ are reported to have increased stability of the garnet-type structure, higher ionic conductivity, etc., due to the effects of the additional elements. LLZ and compounds analogous to LLZ are hereinafter collectively referred to in this specification as "LLZ garnet-type compounds."

LLZ garnet-type compounds, which have high lithium ion conductivity and high electrochemical stability against lithium metal, are promising candidates as solid electrolyte materials for all-solid lithium secondary batteries. All-solid lithium secondary batteries, which comprise a non-flammable solid electrolyte, are next-generation secondary batteries that provide the ultimate level of safety. Research and development of materials and devices for putting such new-generation secondary batteries into practical use are actively being conducted.

When an LLZ garnet-type compound is to be applied to all-solid lithium secondary batteries, producing an LLZ garnet-type compound in the form of fine particles is desirable. This is because when a solid electrolyte material is to be used as a lithium ion conduction aid in an electrode layer, a solid electrode material that is in the form of fine particles in a battery manufacturing process is considered to be suitable to ensure a sufficient contact interface with an electrode active material. Such a fully ensured contact interface between the solid electrolyte material and the electrode active material satisfactorily establishes ion conducting pathways to thereby increase the utilization rate of a positive electrode active material, thus providing an all-solid lithium secondary battery as a storage battery with high energy density.

In view of recent social demands for lowering the price of secondary batteries, establishing a method for producing a solid electrolyte material, which is a main component of all-solid lithium secondary batteries, at a low cost with high productivity is also considered to be of importance to put all-solid lithium secondary batteries into practical and common use.

From these viewpoints, with attempts to improve the above properties of LLZ garnet-type compounds, various techniques for methods of producing LLZ garnet-type compounds have been proposed (see Non-patent Literature (NPL) 2 and Patent Literature (PTL) 1 to PTL 4).

CITATION LIST

Patent Literature

PTL 1: JP2010-202499A
PTL 2: JP2011-51800A
PTL 3: JP2013-184848A
PTL 4: JP2012-224520A

Non-Patent Literature (NPL)

Non-patent Literature (NPL) 1: Journal of the American Ceramic Society (J. Am. Ceram. Soc.), 2003, volume 86, pages 437 to 440,
Non-patent Literature (NPL) 2: Angewandte Chemie International Edition (Angew. Chem. Int. Ed.), 2007, volume 46, pages 7778 to 7781

SUMMARY OF INVENTION

Technical Problem

However, conventional production methods fail to produce an LLZ garnet-type compound in the form of fine particles with high productivity. For example, although low-temperature firing is generally preferable for producing fine particles, conventional methods for synthesizing an LLZ garnet-type compound using a solid-phase reaction process comprise firing at a high temperature of 1,000 to 1,200° C. (see NPL 2, PTL 1, and PTL 2.) When firing is performed at such a high temperature in the range of 1,000 to 1,200° C., grain growth is easily promoted, which results in difficulty in directly obtaining fine particles. Further, since firing at a temperature of 1,000° C. or higher is accompanied by volatilization of a large amount of a Li component, significantly reduced production efficiency is also problematic. Furthermore, Li components vaporized by high-temperature firing may cause corrosion of firing vessels and manufacturing equipment. Production methods comprising firing at a high temperature are also not preferable from this point.

When liquid phase synthesis using a metal alkoxide or the like is applied, the firing temperature can be lowered to less than 1,000° C. (see PTL 3). However, this method requires a large amount of organic solvent, and is not preferable from the standpoints of manufacturing costs and environmental impact.

As another method, an aqueous neutralization-coprecipitation method is known to synthesize an LLZ garnet-type compound without using an organic solvent at a firing temperature of 950° C. or lower (see PTL 4). However, this method requires a step of evaporating a slurry having a concentration of several percent to dryness, thus resulting in poor production efficiency. Furthermore, this method requires about 1.5-fold to 2.5-fold excess of Li fed as a starting material relative to Li remaining in the LLZ garnet-type compound in terms of molar ratio. This also causes poor productivity.

As described above, when using conventional techniques, it is difficult to produce an LLZ garnet-type compound in the form of fine particles that is suitable for application to all-solid lithium secondary batteries. Furthermore, conventional techniques cannot produce an LLZ garnet-type compound with high production efficiency.

The present invention has been made in view of the current problems described above. A primary object of the present invention is to provide a method for producing a garnet-type compound containing zirconium (Zr) and lithium (Li), the compound being in the form of fine particles, with high productivity.

Solution to Problem

The present inventors conducted extensive research to achieve the above object. As a result, the inventors found that this object can be achieved by using an aqueous solution of a zirconium carbonate complex as a Zr source, adding a Li source to the precipitate obtained from the aqueous solution, and firing the mixture. The present invention has been accomplished based on this finding.

More specifically, the present invention provides the following garnet-type compound, methods for producing the garnet-type compound, and all-solid lithium secondary battery comprising the garnet-type compound.

1. A method for producing a garnet-type compound that contains, as constituent elements, Zr, Li, and element $M^1$ (wherein $M^1$ is at least one element selected from the group consisting of La, Sc, Y, and Ce), the method comprising:
(1) a first step of mixing a first raw material and a second raw material to obtain a precipitate, the first raw material being a solution comprising a zirconium carbonate complex and having a pH of at least 7.0 and not more than 9.5, the second raw material comprising a compound containing the above element $M^1$ as a constituent element; and
(2) a second step of mixing the precipitate and a third raw material to obtain a mixture, the third raw material containing Li as a constituent element, and then firing the mixture at a temperature of less than 1,000° C. to obtain a fired product, the first raw material being a solution prepared in such a manner that the molar ratio of carbonate species to zirconium species (number of moles of carbonate species/number of moles of zirconium species) is in the range of 1.5 or more to 15.0 or less, at least one of the counter ions of the zirconium carbonate complex being $NR_4^+$ (wherein each R independently represents at least one substituent selected from the group consisting of H, $CH_3$, and $CH_2CH_2OH$).

2. The method for producing a garnet-type compound according to Item 1, wherein at least one of the first raw material and the second raw material contains at least one of element $M^2$ (wherein element $M^2$ is at least one element selected from the group consisting of B, Al, Si, P, and Ge) and element $M^3$ (wherein $M^3$ is at least one element selected from the group consisting of Hf, Nb, and Ta), the element $M^1$ being present at a molar ratio to Zr in the first raw material (number of moles of $M^1$/number of moles of Zr) of 1 or more and 2 or less, the element $M^2$ being present at a molar ratio to Zr in the first raw material (number of moles of $M^2$/number of moles of Zr) of 0 or more and 0.8 or less, and the element $M^3$ being present at a molar ratio to Zr in the first raw material (number of moles of $M^3$/number of moles of Zr) of 0 or more and 0.5 or less.

3. The method for producing a garnet-type compound according to Item 1 or 2, wherein in the first step, the precipitate is heated at a temperature of 80° C. or more.

4. The method for producing a garnet-type compound according to any one of Items 1 to 3, wherein the mixture in the second step is obtained by dispersing the precipitate in a solution containing the third raw material to prepare a dispersion and then evaporating the dispersion to dryness.

5. The method for producing a garnet-type compound according to any one of Items 1 to 3, wherein the compound containing Li as a constituent element is at least one compound selected from the group consisting of oxides, hydroxides, chlorides, carbonates, nitrates, sulfates, and organic acid salts of Li, and the mixture in the second step is obtained by dry blending.

6. A garnet-type compound produced by the method according to any one of Items 1 to 5.

7. A secondary battery that is an all-solid lithium secondary battery comprising the garnet-type compound according to Item 6, the battery comprising:
a positive electrode layer containing a positive electrode active material,
a negative electrode layer containing a negative electrode active material, and
a solid electrolyte layer being interposed between the positive electrode layer and the negative electrode layer,
wherein at least one of the positive electrode layer, negative electrode layer, and solid electrolyte layer contains the garnet-type compound.

Advantageous Effects of Invention

The production method according to the present invention can produce a garnet-type compound without using an organic solvent. Furthermore, since efflux of water-soluble Li components can be prevented, the method of the present invention eliminates the need to use an excess of a Li source and thus can produce a garnet-type compound with excellent production efficiency. Further, in the production method of the present invention, a garnet-type compound is obtained by using as a precursor a precipitate formed using a solution containing a zirconium carbonate complex. The elements constituting a garnet-type compound are considered to be uniformly dispersed in this precipitate. Accordingly, when the precipitate is used, the firing temperature used for producing a garnet-type compound can be lowered to less than 1,000° C., thus producing a garnet-type compound in the form of fine particles.

The garnet-type compound obtained by the method is in the form of fine particles and is thus suitable for application to all-solid lithium secondary batteries.

Since the all-solid lithium secondary battery according to the present invention contains a garnet-type compound as described above, the internal resistance of the battery is suppressed due to high lithium ion conductivity of the garnet-type compound, and the all-solid lithium secondary battery has high battery performance, such as in rate characteristics. Further, since the garnet-type compound is present in the form of fine particles in an electrode layer of the all-solid lithium secondary battery, a sufficient interface with an electrode active material is ensured. Accordingly, ion conducting pathways to the electrode active substance are constructed satisfactorily, and the ratio of the electrode active substance failing to contribute to a battery reaction decreases, thus providing an all-solid lithium secondary battery with a high energy density.

DESCRIPTION OF EMBODIMENTS

Figure 1:
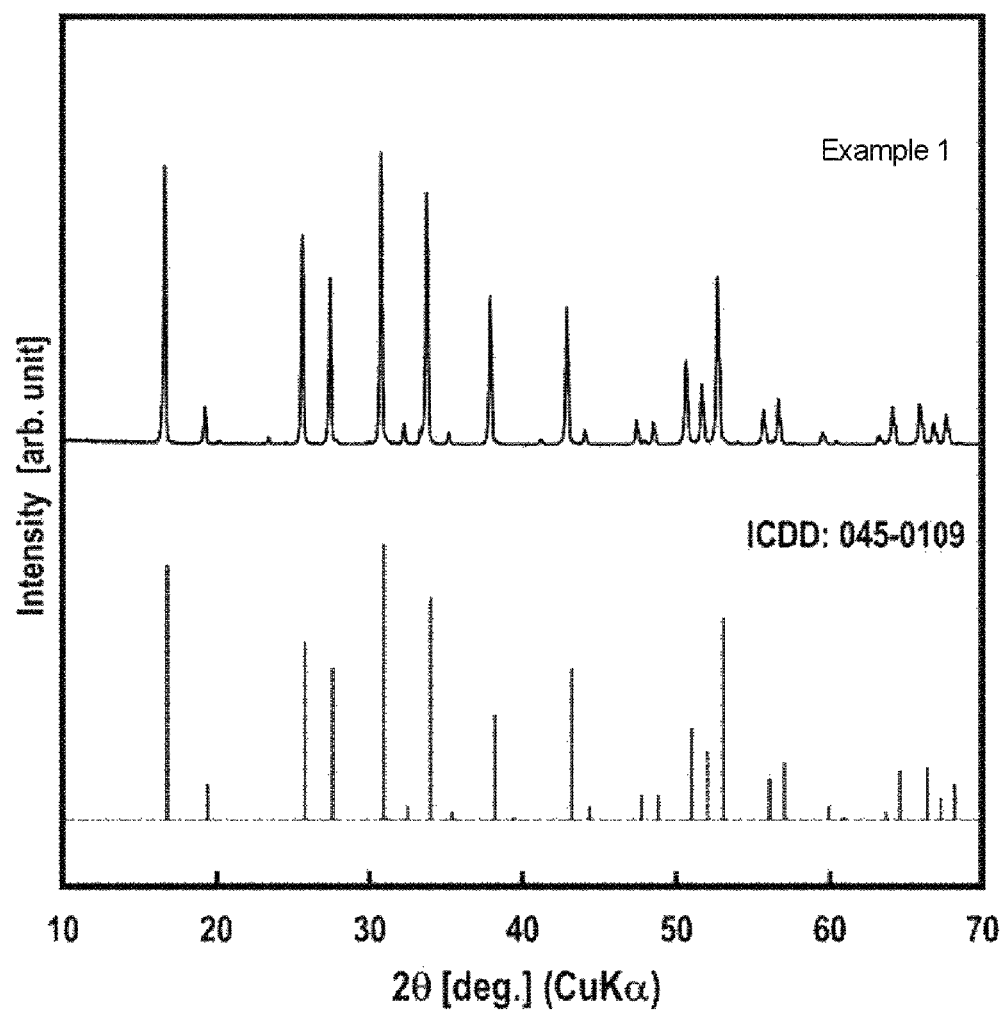
FIG. 1 shows the results (XRD pattern) of powder X-ray diffraction measurement of the garnet-type compound obtained in Example 1.

A mode for carrying out the invention will be described below in detail.

A. Method for Producing the Garnet-Type Compound

The garnet-type compound of the present invention is a compound containing Zr, Li, and element $M^1$ as constituent elements and having a garnet-type structure as its main crystal structure. Element $M^1$ is a main constituent element other than Zr and Li in the garnet-type compound. $M^1$ corresponds to a rare earth element having a relatively small atomic weight. Specifically, the element $M^1$ is at least one element selected from the group consisting of La, Sc, Y, and Ce. In particular, the molar ratio (La/$M^1$) of La to $M^1$ is preferably 0.8 or more. In this case, a garnet-type compound can be obtained more stably by the production method below.

The garnet-type compound can be produced by a process comprising steps 1 and 2 described below in (1) and (2):
(1) a first step of mixing a first raw material and a second raw material to obtain a precipitate, the first raw material comprising a zirconium carbonate complex and being a solution having a pH of at least 7.0 and not more than 9.5, the second raw material comprising a compound containing the above element $M^1$ as a constituent element; and
(2) a second step of mixing the precipitate and a third raw material to obtain a mixture, the third raw material containing Li as a constituent element, and then firing the mixture at a temperature of less than 1,000° C. to obtain a fired product.

The first raw material is a solution prepared in such a manner that the molar ratio of carbonate species to zirconium species (number of moles of carbonate species to number of moles of zirconium species) is within the range of 1.5 or more and 15.0 or less.

At least one of the counter ions of the zirconium carbonate complex is $NR_4^+$. Each R of $NR_4^+$ represents at least one substituent selected from the group consisting of H, $CH_3$, and $CH_2CH_2OH$).

A feature of the above production method is that in the first step, a solution containing a zirconium carbonate complex is used to obtain a precipitate containing Zr element and other metal element(s) (e.g., element $M^1$), and this precipitate is used as a precursor to obtain a desired product. The precipitate thus formed advantageously possesses a higher level of dispersion of the above elements, compared with a precipitate formed by a known neutralization-coprecipitation method.

Since each element is highly dispersed in the precipitate as described above, thermal diffusion of constituent elements occurs, whereby a reaction for producing the desired compound can take place with less energy. Accordingly, energy required to obtain the fired product in the second step is reduced and the firing temperature can be expected to be lowered. As a result, grain growth during the firing is suppressed, and a garnet-type compound in the form of fine particles can be easily obtained.

The reason why the dispersibility of the elements in the precipitate is improved is considered to be as follows. Since zirconium carbonate complex ions are anionic, a precipitate is formed in the state that zirconium carbonate complex ions are positioned close to other cationic metal ions at the atomic level. According to the conventional neutralization-coprecipitation method, an acidic aqueous solution, such as hydrochloric acid solution or nitric acid solution, containing Zr and other metal element(s) is reacted with a basic aqueous solution, such as aqueous ammonia. Therefore, when the neutral pH of Zr greatly differs from that of the other metal element(s), either of the elements is precipitated earlier. As a result, in the neutralization-coprecipitation method, significant segregation of elements in the precipitate occurs. The precipitate obtained by the neutralization-coprecipitation method is different from the precipitate obtained in step 1 above in this respect. In the synthesis of a multiple oxide, such as a garnet-type compound, dispersibility of constituent elements in a precursor is particularly important from the viewpoint of obtaining the product as a single phase. In this point, the production method comprising steps 1 and 2 above is a particularly excellent method for producing a garnet-type compound. The "single phase" referred to above means that the garnet-type compound contains crystals of a cubic garnet-type structure as a main component and contains almost no impurity phase composed of other crystals. Various crystals can be considered to be the impurity phase. Examples include $La_2Zr_2O_7$ and the like.

A feature of the above production method is that a garnet-type compound can be produced without using an organic solvent. A garnet-type compound may be produced without using any organic solvent. Accordingly, the above production method is less likely to cause problems such as waste water and environmental impact, and can thus produce a garnet-type compound with good productivity.

The details of, for example, each raw material and production conditions used in each step of the above production method are explained below.

The First Step

The first raw material is a solution containing a zirconium carbonate complex and having a pH of at least 7.0 and not more than 9.5. The solvent for the first raw material may be water alone or a mixed solvent of water and an organic solvent, such as alcohol. From the viewpoint of using no organic solvents in the entire production process, using water alone is preferable. More specifically, the first raw material is preferably an aqueous solution containing a zirconium carbonate complex.

The solution containing the zirconium carbonate complex as a first raw material can be prepared by mixing at least a compound containing a carbonate species and a compound containing a zirconium species (Zr species) at a specific ratio. The carbonate species as used here refers to at least one species selected from the group consisting of carbonic acid ($H_2CO_3$), bicarbonate ion ($HCO_3^-$), and carbonate ion ($CO_3^{2-}$), and the Zr species refers to zirconium or zirconium ions. A compound containing a Zr species as mentioned above is hereinafter simply referred to as a "Zr source."

Specific examples of carbonate species-containing compounds include, but are not limited to, ammonium hydrogen carbonate, lithium hydrogen carbonate, tetramethyl ammonium bicarbonate, ammonium carbonate, carbon dioxide, and the like. These raw materials can be used singly or in a combination of two or more.

Specific examples of the Zr source include, but are not limited to, crystals of zirconium carbonate ammonium (($NH_4$)$_3$Zr(OH)(CO$_3$)$_3$·2H$_2$O), zirconium basic carbonate (Zr(OH)$_{(4-2n)}$(CO$_3$)$_n$·mH$_2$O, n=0.2 to 1.0, m=1 to 10), zirconium oxychloride (ZrOCl$_2$), and zirconium oxynitrate (ZrO(NO$_3$)$_2$). These Zr sources can be used singly or in a combination of two or more. When the Zr source is zirconium oxychloride, zirconium oxynitrate, or the like, their hydrates may also be used.

The solution containing a zirconium carbonate complex as the first raw material can be prepared by using a compound containing both of carbonate and Zr species. The compound having both of carbonate and Zr species as referred to herein includes, for example, crystals of zirconium carbonate ammonium (($NH_4$)$_3$Zr(OH)(CO$_3$)$_3$·2H$_2$O), zirconium basic carbonate (Zr(OH)$_{(4-2n)}$(CO$_3$)$_n$·mH$_2$O, n=0.2 to 1.0, m=1 to 10), and the like. Such compounds having both of carbonate and Zr species can be treated as a Zr source and also as a carbonate species-containing compound.

In the preparation of a solution containing a zirconium carbonate complex, the carbonate species-containing compound and the Zr source are mixed in a proportion such that the molar ratio of carbonate species to zirconium species, i.e., the number of moles of carbonate species/the number of moles of zirconium species is within the range of 1.5 or more and 15.0 or less. This mixing may be performed by mixing the carbonate species-containing compound and the Zr source in the form of solids as is and then dispersing the mixture in a solvent, or by mixing a solution of the carbonate species-containing compound with a solution of the Zr source. When a solution containing a zirconium carbonate complex is prepared by using a compound containing both of carbonate and Zr species, the solution can be prepared by dissolving this compound in a solvent. In this case, a compound containing both of carbonate and Zr species may be suitably selected as long as the molar ratio (the number of moles of carbonate species/the number of moles of zirconium species) is within the range of 1.5 or more to 15.0 or less, preferably 2.0 or more to 14.0 or less.

The molar ratio is described here in more detail. The "number of moles of carbonate species/the number of moles of zirconium species" is defined as a value obtained by dividing the number of moles of carbonate species contained in all of the raw materials used for producing a zirconium carbonate complex solution by the number of moles of Zr element contained in the Zr source (the number of moles of carbonate species/the number of moles of zirconium species). This molar ratio is based on the consideration that the concentration change may occur due to slight evaporation of the carbonate species and $NR_4^+$ described below from a final aqueous solution prepared. When crystals of zirconium carbonate ammonium, zirconium basic carbonate, or the like is used as a Zr source, the number of moles of carbonate species contained in these compounds is also taken into consideration.

When a carbonate species-containing compound and a Zr source are mixed at a molar ratio within the range mentioned above, the carbonate is coordinated to a zirconium (IV) ion. For example, when the carbonate species is $CO_3^{2-}$, Zr monomer complex ion $[Zr(CO_3)_n]^{(2n-4)-}$ {$9 \geq n \geq 4$} and Zr dimer complex ion $[Zr_2(OH)_2(CO_3)_6]^{6-}$ are considered to be formed. A solution containing a zirconium carbonate complex is thus obtained. When a compound containing both carbonate species and Zr species is used, a solution containing a zirconium carbonate complex is obtained by forming the above complex ions. The formation of zirconium carbonate complex ions can be confirmed by analyzing information on the coordination number, coordination distance, and local structure obtained by using extended X-ray absorption fine structure (EXAFS) measurement, Raman spectroscopy measurement, nuclear magnetic-resonance (NMR) measurement, etc.

The molar ratio (number of moles of carbonate species/number of moles of zirconium species) is preferably 3.0 or more and 7.0 or less. In this case, a more stable zirconium carbonate complex is formed.

In the solution containing the above zirconium carbonate complex, at least one counter cation of zirconium carbonate complex ions should be $NR_4^+$. R is at least one substituent selected from the group consisting of H, $CH_3$, and $CH_2CH_2OH$. All Rs may be the same, or all or some Rs may be different. Due to the presence of such $NR_4^+$ cations, zirconium carbonate complex ions can be more stably present in a solution. Specific examples of $NR_4^+$ include, but are not limited to, ammonium ions ($NH_4+$), tetramethyl ammonium ions (($CH_3$)$_4$N$^+$), 2-hydroxyethyl trimethyl ammonium ions (($CH_3$)$_3$N($CH_2CH_2OH$)$^+$), and the like. Among these, ammonium ions ($NH_4+$) are preferable as $NR_4^+$ from the viewpoint of low costs of the raw material. In order to dispose $NR_4^+$ as a counter cation of zirconium carbonate complex ions, for example, a material that can impart $NR_4^+$ to the solution may be added when a solution containing zirconium carbonate complex ions is prepared. Examples of materials that can impart $NR_4^+$ to the solution include, but are not limited to, ammonium hydroxide ($NH_4OH$, aqueous ammonia), tetramethyl ammonium hydroxide (($CH_3$)$_4$N(OH)), choline hydroxide (($CH_3$)$_3$N($CH_2CH_2OH$)(OH)), and the like. These materials can be used singly or in any combination of two or more. The material that can impart $NR_4^+$ to the solution may further contain at least one of ammonium hydrogen carbonate, tetramethyl ammonium bicarbonate, ammonium carbonate, and the like.

When the solution containing a zirconium carbonate complex is to be produced, a compound other than a carbonate species-containing compound and a Zr source, such as a chelating agent, may be added as long as the formation of a zirconium carbonate complex is not impaired. The presence of a chelating agent enhances the stability of an aqueous solution of a zirconium carbonate complex and can suppress Zr consumption by a self-hydrolysis reaction. Examples of chelating agents include ethanolamines such as monoethanolamine, diethanolamine, and triethanolamine; organic acids such as tartaric acid, citric acid, lactic acid, gluconic acid, and glycolic acid; and ethanolamine salts, organic acid salts, and the like. These compounds can be used singly or in a combination of two or more. The molar ratio of the chelating agent to zirconium (chelating agent/Zr) may be 0.01:1 to 1:1.

The zirconium carbonate complex-containing solution has a pH of at least 7.0 and not more than 9.5. Due to a pH of 7.0 or higher, the zirconium carbonate complex-containing solution can efficiently form a precipitate with an acidic aqueous solution. Due to a pH of 9.5 or lower, the concentration of free hydroxide ions present in the zirconium carbonate complex solution becomes sufficiently low, thus suppressing the formation of a precipitate as a hydroxide. The pH can be adjusted by the mixing ratio of various materials used to prepare the zirconium carbonate complex solution, the amount of solvent used, etc. Alternatively, an additive, such as a pH adjusting agent, may be added to adjust the pH.

The second raw material comprises compound containing element $M^1$ as a constituent element. The compound containing element $M^1$ as a constituent element is hereinafter simply referred to as "$M^1$ source." The $M^1$ source may be, for example, a water-soluble salt of element $M^1$. Examples of the water-soluble salt of element $M^1$ include nitrates, acetates, chlorides, and the like of element $M^1$. Specific examples of $M^1$ are as follows. When $M^1$ is La, examples include lanthanum nitrate, lanthanum acetate, lanthanum chloride, and hydrates thereof. When $M^1$ is Sc, examples include scandium nitrate, scandium acetate, scandium chloride, and hydrates thereof. When $M^1$ is Y, examples include yttrium nitrate, yttrium acetate, yttrium chloride, and hydrates thereof. When $M^1$ is Ce, examples include cerium nitrate, cerium acetate, cerium chloride, and hydrates thereof. The compounds mentioned above as examples may be used singly or in any combination of two or more. Such a compound is dissolved in pure water or the like to form an aqueous solution of an $M^1$ source.

The second raw material, which contains an $M^1$ source, may be in the form of a solid or solution. When the second raw material is in the form of a solution, it is preferably an aqueous solution for the same reason as stated above.

When the second raw material is in the form of a solution, the pH is not particularly limited. For example, the solution may have a pH of 0.1 to 3. When the pH is within this range, the second raw material can efficiently form a precipitate with the zirconium carbonate complex as the first raw material. When the $M^1$ source is dissolved in water, an acid, such as nitric acid or hydrochloric acid, is used to adjust the pH of an aqueous solution.

Either one or both of the first and second raw materials may contain either one or both of elements $M^2$ and $M^3$. Element $M^2$ is at least one element selected from the group consisting of B, Al, Si, P, and Ge, whereas element $M^3$ is at least one element selected from the group consisting of Hf, Nb, and Ta.

To introduce the elements $M^2$ and $M^3$ into the first or second raw material, a compound containing element $M^2$ as a constituent element or a compound containing element $M^3$ as a constituent element may be added. The compound containing element $M^2$ as a constituent element and the compound containing element $M^3$ as a constituent element may be hereinafter simply referred to as "$M^2$ source" and "$M^3$ source."

The element $M^2$ source is preferably dissolved in the solution of the first raw material or the solution of the second raw material. Examples of element $M^2$ sources include nitrates, acetates, chlorides, oxides, and hydroxides, oxo acid, lithium salts of oxo acids, ammonium salts of oxo acids, and the like of element $M^2$. Specific examples of element $M^2$ are as follows. When element $M^2$ is B, examples include boric acid, boron oxide, lithium metaborate, lithium tetraborate, lithium orthoborate, trilithium borate, and the like. When element $M^2$ is Al, examples include aluminium nitrate, aluminium acetate, aluminium chloride, aluminum oxide, aluminum hydroxide, and the like. When element $M^2$ is Si, examples include silicic acid, silicon oxide, lithium metasilicate, lithium pyrosilicate, lithium orthosilicate, and the like. When element $M^2$ is P, specific examples include phosphoric acid, diphosphorus pentaoxide, lithium metaphosphate, lithium pyrophosphate, lithium orthophosphate, ammonium phosphate, ammonium hydrogen phosphate, and the like. When element $M^2$ is Ge, specific examples include germanium dioxide, lithium metagermanate, lithium orthogermanate, and the like. These $M^2$ sources may be used singly or in any combination of two or more. The nitrates, acetates, or chlorides of element $M^2$ may be hydrates thereof.

Whether element $M^2$ is incorporated into a first raw material (a solution containing a zirconium carbonate complex) or a second raw material (a raw material containing an $M^1$ source) is not particularly limited as long as element $M^2$ source can be dissolved. When element $M^2$ is Al, the $M^2$ source is preferably dissolved in the second raw material solution.

Element $M^3$ is a second minor additional component of a garnet-type compound produced by the present invention (element $M^2$ is a first minor additional component). Element $M^3$ is considered to be an element with which the Zr site can be replaced in the crystal structure of the garnet-type compound. Elements that are stable in a tetravalent or pentavalent oxidation state and that have stable cations having an ion radius close to zirconium (IV) ion belong to element $M^3$. Specifically, $M^3$ is at least one element selected from Hf, Nb, and Ta. The presence of element $M^3$ is considered to improve the stability of the crystal structure of the garnet-type compound. Another effect of element $M^3$ is improvement of electrical properties of garnet-type compounds, such as an increase in lithium ion conductivity. The garnet-type compound produced by the present invention is preferably such that element $M^3$ is not present in the form of an oxide or a salt. X-ray diffraction measurement can confirm that element $M^3$ is not present in the form of an oxide or salt.

The $M^3$ source is preferably dissolved in the solution of the first raw material or in the solution of the second raw material. Examples of $M^3$ sources include nitrates, chlorides, oxychlorides, oxides, oxalates, lithium oxalate, and the like of element $M^3$. Specific examples of element $M^3$ sources are as follows. When element $M^3$ is Hf, examples include hafnium nitrate, hafnium chloride, hafnium oxychloride, hafnium oxychloride hydrate, and the like. When element $M^3$ is Nb, examples include niobium oxide, niobium oxalate, niobium chloride, lithium niobate, and the like. When element $M^3$ is Ta, examples include tantalum oxide, tantalum oxalate, tantalum chloride, tantalum niobate, and the like. These $M^3$ sources can be used singly or in a combination of two or more.

The zirconium compound typically contains a small amount of a hafnium component as an inevitable component. This also applies to a Zr source used in the preparation of a solution of a zirconium carbonate complex contained in the first raw material. The content of the hafnium component is typically such that the molar ratio of hafnium to zirconium (Hf/Zr) is about 0.01:1 to about 0.05:1. Accordingly, when Hf is selected as element $M^3$, the hafnium component contained in the Zr source may be used as a Hf source.

Whether element $M^3$ is incorporated into the first raw material or the second raw material is not particularly limited as long as the element $M^3$ source can be dissolved.

Element $M^1$ is preferably present in the second raw material at a molar ratio to Zr contained in the first raw material (number of moles of $M^1$/number of moles of Zr) of 1 or more and 2 or less. Element $M^2$ is preferably present in the first or second raw material at a molar ratio to Zr contained in the first raw material (number of moles of M/number of moles of Zr) of 0 or more and 0.8 or less. When element $M^2$ is present in both the first and second raw materials, the number of moles of $M^2$ refers to the total amount of $M^2$ contained in these materials. Element $M^3$ is preferably present in the first or second raw material at a molar ratio of element $M^3$ to Zr contained in the first raw material (number of moles of $M^3$/number of moles of Zr) of 0 or more and 0.5 or less. When the element $M^3$ is present in both the first and second raw materials, the number of moles of $M^3$ refers to the total amount of $M^3$ contained in these materials. Due to elements $M^1$, $M^2$, and $M^3$ contained in the amounts described above, the desired garnet-type compound can be more stably produced, thus contributing to enhance the productivity more easily.

The molar ratio of element $M^1$ to Zr contained in the first raw material is more preferably 1.4 or more and 1.6 or less. In this case, a garnet-type compound can be more stably obtained. When the molar ratio of element $M^2$ to Zr contained in the first raw material is 0.8 or less, the presence of oxides, salts, etc., of element $M^2$ as impurities in the garnet-type compound is suppressed. A preferable molar ratio of element $M^2$ to Zr contained in the first raw material is 0 or more and 0.4 or less, and more preferably 0 or more and 0.3 or less. When the molar ratio of element $M^3$ to Zr contained in the first raw material is 1.0 or less, the presence of oxides, salts, etc., of element $M^3$ as impurities in the garnet-type compound is suppressed. A preferable molar ratio of element $M^3$ to Zr contained in the first raw material is 0 or more and 0.5 or less, and more preferably 0 or more and 0.3 or less.

When element $M^2$ is contained in the first raw material and/or the second raw material, element $M^2$ is a first minor additional component of the garnet-type compound finally produced. Element $M^2$ is an element with which the Li site in the crystal structure of the garnet-type compound can be replaced. Element M2 corresponds to a light element that can involve 4 or 6 oxygen atoms in coordination environment.

The presence of such an element $M^2$ is considered to enhance the stability of the crystal structure of the garnet-type compound. Another effect of element $M^2$ is improvement of electrical properties of a garnet-type compound, such as an increase in lithium ion conductivity. Element $M^2$ may be introduced into the crystal structure of a garnet-type compound, or may be present in the form of an oxide or the like in grain boundaries of a garnet-type compound. The condition of element $M^2$ in the garnet-type compound can be confirmed by X-ray diffraction measurement, transmission electron microscopy, etc.

In the first step, the first raw material and the second raw material are mixed to obtain a precipitate. The mixing method is not particularly limited. For example, a solution of the first raw material and a solution of the second raw material may be mixed together in predetermined amounts. Alternatively, when the second raw material is in the form of a solid, the second raw material may be directly added to the solution of the first raw material.

A precipitate is formed in a liquid by mixing the first and second raw materials. As stated above, this precipitate possesses particularly excellent dispersion of the elements. Specifically, there is no local uneven distribution of the same element in the precipitate. Since a precipitate containing such uniformly dispersed elements is obtained, the firing temperature for producing a fired product in the subsequent second step can be lowered.

After the precipitate is formed, the precipitate may be heated to a temperature of 80° C. or higher. Although the heating method is not particularly limited, a solution (slurry) containing the precipitate may be directly heated without filtering off the precipitate beforehand. When the precipitate is heated, thickening of the slurry is observed. Although the cause of this phenomenon is not clear, it is considered to be due to the gelling property of an aqueous zirconium carbonate complex solution upon heating. Since this phenomenon is expected to cause ionic species not entirely precipitated to be uniformly incorporated into the gel, the composition ratio of the precipitate can more closely approximate the composition ratio of the feed, thus contributing to higher productivity. The heating temperature is more preferably a temperature of 90° C. or higher. When the precipitate is heated to 90° C. or higher, the thickening phenomenon of the slurry can be observed in a shorter time. Although the upper limit of the heating temperature is not particularly limited, it may be, for example, 200° C.

Second Step

The second step is a step of preparing a mixture of the precipitate obtained in the first step and a third raw material comprising a compound containing Li as a constituent element, and then firing the mixture at a temperature of less than 1,000° C. to obtain a fired product.

The third raw material used in the second step is a raw material comprising a compound containing Li as a constituent element. The compound containing Li as a constituent element is hereinafter simply referred to as "Li source."

Specific examples of the Li source include, but are not limited to, lithium oxide, lithium hydroxide, lithium chloride, lithium carbonate, lithium hydrogen carbonate, lithium nitrate, lithium sulfate, lithium acetate, lithium citrate ($Li_3C_6H_5O_7$), and lithium oxalate ($Li_2(COO)_2$). When various Li salts mentioned above as examples of Li sources are used as Li sources, these salts may be used in the form of hydrates thereof. The third raw material may contain additives other than Li sources mentioned above.

The third raw material may be in the form of a solid, such as a powder or a solid, or may be in the form of a liquid dispersed or dissolved in a solvent. When a third raw material is in the form of a solution, various solvents can be used. Water is preferably used as the solvent from the viewpoint of using no organic solvents.

The amount of the Li source used is not particularly limited as long as a desired garnet-type compound is obtained. In view of saving the amount of Li source used, the amount of the Li source used is preferably adjusted to a less than 1.5-fold molar ratio, more preferably less than 1.3-fold molar ratio, to the amount of Li in the desired garnet-type compound.

The method for mixing the precipitate formed in the first step and the third raw material is not particularly limited. For example, the precipitate formed in the first step may be separated by filtration beforehand and the precipitate may be dispersed again in an aqueous solution in which a Li source (a third raw material) is dissolved to obtain a dispersion. The filtration of the precipitate may be performed in the first step or in the second step. The dispersion obtained by the above mixing is evaporated to dryness to obtain a solid comprising a precipitate and a Li element added thereto.

The "evaporation to dryness" as used here refers to an operation for obtaining a solid by distilling off a liquid from a material containing a solution or liquid. In the above constituent feature, the method for evaporation to dryness is not particularly limited, and generally known drying techniques can be used. For example, stationary dryers, conveyor dryers, rotary dryers, stirring dryers, reduced pressure dryers, spray dryers, and vacuum freeze dryers can be used to perform the evaporation to dryness. The temperature at which the evaporation to dryness is performed is not particularly limited. For example, when a stationary dryer is used, the temperature is preferably in the range of 50 to 200° C., more preferably 60 to 150° C., and even more preferably 70 to 130° C.

In the above constituent feature, in order to minimize the energy necessary for evaporation to dryness, the dispersion concentration of the precipitate is preferably higher than 10 wt. %. The dispersion concentration of the precipitate is preferably 15 wt. % or higher, and more preferably 20 wt. % or higher. The dispersion concentration of the precipitate as used herein is defined as follows. First, the virtual weights of oxides of Zr, $M^1$, $M^2$, and $M^3$ contained in the precipitate are calculated from the compositions of Zr, $M^1$, $M^2$, and $M^3$ in the precipitate. The sum of the virtual weights of the oxides is divided by the sum of the weight of the precipitate and the weight of an aqueous Li source solution, and the obtained value is multiplied by 100 to obtain a dispersion concentration of the precipitate (weight percent concentration). The chemical formulas of the virtual oxides of the elements are $ZrO_2$, $La_2O_3$, $Sc_2O_3$, $Y_2O_3$, $CeO_2$, $B_2O_3$, $Al_2O_3$, $SiO_2$, $P_2O_5$, $GeO_2$, $HfO_2$, $Nb_2O_5$, and $Ta_2O_5$.

When the above mixing method is used in the second step, a solid comprising a precipitate and Li homogenously added to the precipitate can be obtained. The Li source in this mixing method may be selected from any of the Li sources mentioned above as long as they are soluble in water. Specific examples of Li sources include water-soluble Li salts, such as lithium nitrate, lithium hydroxide, lithium hydrogen carbonate, and lithium acetate. These Li salts may be used singly or in a combination of two or more.

A method other than the method mentioned above can also be used as a mixing method. First, as in the above mixing method, a precipitate formed in the first step may be separated by filtration, and the precipitate and a third raw material are directly mixed. The third raw material used here may be in the form of a solid, such as a powder, or in the form of a solution or dispersion. In this mixing method, generally known kneaders or mixers can be used. The mixing can be performed, for example, using powder mixers, automatic mortars, and grinding mills, ball mills, or the like. Among these, using a ball mill is preferable because a Li source can be added in a more homogeneously dispersed state to the precipitate. Using a planetary ball mill is particularly preferable. Although the conditions of ball milling are not particularly limited, a zirconia container and zirconia balls are preferably used. Although the diameter of the balls is not particularly limited, it is preferably in the range of 0.1 mm to 10 mm. The mixing may be performed by dry blending in which solids, such as powders, are mixed together, or by wet mixing using water or an organic solvent. Among these, dry blending is preferable because the step of removing a solvent can be skipped.

A solid in which Li is uniformly added to a precipitate can also be obtained by using such a mixing method. The Li source used in this mixing method is not particularly limited and any of the Li compounds mentioned above can be used. At least one compound selected from the group consisting of oxides, hydroxides, chlorides, carbonates, nitrates, sulfates, and organic acid salts of Li is particularly preferable for use.

After a mixture of the precipitate and a third raw material is prepared, the mixture is fired at a temperature of less than 1,000° C. to obtain a fired product. Firing can be performed, for example, in an air atmosphere. The obtained fired product has a garnet-type structure and is the desired garnet compound. Firing at a temperature of less than 1,000° C. can produce a garnet compound in the form of fine particles. Scanning electron microscope observation can confirm that the garnet compound obtained by firing is in the form of fine particles. Specifically, when the particle size of all of the primary particles observed in a scanning electron micrograph is 20 μm or less, the obtained garnet compound can be determined to be in the form of fine particles.

When the above firing temperature is a high temperature of 1,000° C. or more, grain growth is easily promoted. As a result, it becomes difficult to obtain a fired product in the form of fine particles. Furthermore, because firing at a temperature of 1,000° C. or more is accompanied by volatilization of a large amount of a Li component, production efficiency is significantly reduced, and firing vessels and manufacturing equipment may also be eroded. The lower limit of the firing temperature is not particularly limited as long as a fired product is obtained. For example, the lower limit may be 550° C.

Further, adding the third material in the second step, not in the first step, can prevent the Li component contained in the third raw material from being released from the product. This eliminates the need to use an excess amount of a Li source and thus contributes to enhancement of productivity. The present inventors conducted research, and the results of the research show that when an aqueous lithium hydrogen carbonate solution was used as a Li source and mixed with an aqueous zirconium carbonate complex solution and an aqueous lanthanum nitrate solution to form a precipitate, the amount of Li in the precipitate was about 35%, relative to the amount of Li fed. That is, an attempt to produce a garnet-type compound by using a method comprising adding a third raw material in the first step to form a precipitate results in poor productivity because an excessive amount of Li must be used relative to the desired elementary composition. In contrast, the production method comprising the first and second steps can easily prevent the release of a Li component and has excellent productivity.

B. Garnet-Type Compound

The garnet-type compound produced through the first and second steps above is a compound comprising at least Zr, Li, and element $M^1$ as constituent elements. As long as the crystal structure of the garnet-type compound has a garnet-type structure, the elemental composition, for example, is not particularly limited. For example, the garnet-type compound may be a garnet-type compound represented by $Li_7La_3Zr_2O_{12}$ (LLZ) described in NPL 2 above or a series of compounds analogous to LLZ in which one or more constituent elements of LLZ are replaced with one or more other elements. Examples of compounds analogous to LLZ include $Li_{7-a}M_2^bM_3^1Zr_{2-c}M_3^cO_{12}$ (0≤a≤2, 0≤b≤0.5, 0≤c≤0.66). Specific examples include $Li_{7-a}La_3Zr_{2-c}Hf_cO_{12}$, $Li_{7-a}Al_bLa_3Zr_2O_{12}$, $Li_{7-a}Al_bLa_3Zr_{2-c}Hf_cO_{12}$, $Li_{7-a}La_3Zr_{2-c}Nb_cO_{12}$, $Li_{7-a}La_3Zr_{2-c}(Nb, Hf)_cO_{12}$, $Li_{7-a}La_3Zr_{2-c}Ta_cO_{12}$, $Li_{7-a}La_3Zr_{2-c}(Ta,Hf)_cO_{12}$, $Li_{7-a}(La,Ce)_3Zr_2O_{12}$, and the like. More specifically, examples of compounds analogous to LLZ include $Li_7La_3Zr_{1.97}Hf_{0.03}O_{12}$, $Li_{6.25}Al_{0.25}La_3Zr_2O_{12}$, $Li_{6.4}Al_{0.2}La_3Zr_{1.97}Hf_{0.03}O_{12}$, $Li_{6.75}La_3Zr_{1.75}Nb_{0.25}O_{12}$, $Li_{6.75}La_3Nb_{0.25}Hf_{0.01}Zr_{1.74}O_{12}$, $Li_{6.8}La_3Zr_{1.8}Ta_{0.2}O_{12}$, $Li_{6.7}La_3Zr_{1.68}Ta_{0.3}Hf_{0.02}O_{12}$, $Li_{6.6}La_{2.6}Ce_{0.4}Zr_2O_{12}$, and the like.

$Li_{7-a}M_2^bM_3^1Zr_{2-c}M_3^cO_{12}$, which belongs to the above compounds analogous to LLZ, can be expected to, for example, enhance the stability of the garnet-type structure and ionic conductivity, compared to normal LLZ. In the Description of Embodiments and Examples herein below, LLZ and compounds analogous to LLZ represented by $Li_{7-a}M_2^bM_3^1Zr_{2-c}M_3^cO_{12}$ are collectively referred to simply as "LLZ garnet-type compounds" for the sake of simplification.

The garnet-type structure is generally a crystal structure classified into the cubic space group Ia-3d and refers to a crystal structure that is analogous to the structure of garnet ore. In the present invention, the garnet-type structure not only refers to the crystal structure strictly meeting the above conditions but also includes its analogous structures. Specific examples of such garnet-type structures include tetragonal crystal structures, such as the space group $I4_1$/acd. It is preferable that the garnet-type compound produced by the production method contains crystals classified into a cubic space group, such as space group Ia-3d, and does not contain crystals classified into a tetragonal space group, such as $I4_1$/acd. This is because the resulting garnet-type compound can have higher lithium ion conductivity.

Whether the garnet-type compound has a garnet-type structure can be determined by X-ray diffraction (XRD) measurement. For example, when the garnet-type compound is a cubic LLZ garnet-type compound, a diffraction pattern analogous to 045-0109 ($Li_5La_3Nb_2O_{12}$, cubic space group Ia-3d) of the ICDD powder diffraction file is observed as its XRD pattern. This diffraction pattern of 045-0109 is very similar to the XRD pattern of $Li_7La_3Zr_2O_{12}$ disclosed in NPL 2 above. The XRD pattern of the cubic LLZ garnet-type compound may be slightly different from the diffraction pattern of 045-0109 in diffraction angle and diffraction intensity ratio according to the types and contents of the constituent elements. When the garnet-type compound is, for example, a tetragonal LLZ garnet-type compound, a diffraction pattern similar to 078-6708 ($Li_7La_3Zr_2O_{12}$, tetragonal space group $I4_1$/acd) of the ICDD powder diffraction file is observed. The XRD pattern of the tetragonal LLZ garnet-type compound may be slightly different from the diffraction pattern of 078-6708 in diffraction angle and diffraction intensity ratio according to the types and contents of the constituent elements.

The garnet-type compound produced in the manner described above preferably consists of a substantially single phase of a cubic garnet-type compound because lithium ion conductivity can be enhanced.

Whether the cubic garnet-type compound is a substantially single phase can be determined by XRD measurement. This method is explained below with respect to the case in which $M^1$ is La and the garnet-type compound produced is a cubic LLZ garnet-type compound. More specifically, in an XRD pattern similar to the diffraction pattern of 045-0109 in the ICDD powder diffraction file, the maximum peak intensity in the range of 2θ=16.0 to 17.0°, where a peak derived from a cubic LLZ garnet-type compound is characteristically observed, is defined as a (cps) and read out. Similarly, the maximum peak intensity in the range of 2θ=28.5 to 28.7°, where a peak derived from $La_2Zr_2O_7$ (an impurity phase easily produced upon synthesis of an LLZ garnet-type compound), is defined as b (cps) and read out. In this case, when the peak intensity ratio (b/a) is 0.05 or less, it can be determined that a substantially single phase of a cubic LLZ garnet-type compound was obtained. In contrast, when the peak intensity ratio (b/a) is larger than 0.05, it can be determined that a considerable amount of $La_2Zr_2O_7$, which is an impurity phase, is present and a substantially single phase of a cubic LLZ garnet-type compound fails to be obtained. Even when the values a and b are read out as peak heights from the baseline in the XRD pattern, nearly the same peak intensity ratio (b/a) is obtained.

The garnet-type compound produced through the first and second steps above is preferably in the form of fine particles suitable for application to all-solid lithium secondary batteries. This is because incorporating a garnet-type compound in the form of fine particles into the electrode layer of an all-solid lithium secondary battery contributes to improvement of energy density of the battery. As stated above, scanning electron microscopy observation can confirm whether a garnet-type compound is the form of fine particles by determining whether all of the primary particles have a particle size of 20 μm or less. Among these, the primary particle size is preferably 10 μm or less, and more preferably 5 μm or less.

The garnet-type compound has essentially high lithium ion conductivity. This is clear from the fact that the garnet-type compound of the present invention has a crystal structure similar to highly lithium-ion-conducting materials disclosed in NPL 1, NPL 2 and PTL 1 to 4 above. The lithium ion conductivity of a crystalline compound is often considered separately by dividing the compound into a grain component (bulk component) and a grain boundary component. The lithium ion conductivity of the bulk component is strongly dependent on the crystal structure. The garnet-type compound "having essentially high lithium ion conductivity" means that the bulk component has high lithium ion conductivity.

On the other hand, when the lithium ion-conducting material is used as a solid electrolyte material for all-solid lithium secondary batteries, the total lithium ion conductivity ($\sigma_T$) of the bulk component and the grain boundary component is often important. In the garnet-type compound, the $\sigma_T$ value can be calculated by preparing a sintered body of a garnet-type compound and measuring the resistance of the sintered body. Since the density of the sintered body influences the lithium ion conductivity of the grain boundary component, the relative density to the theoretical density is preferably 80% or more, and more preferably 85% or more. The resistance of the sintered body can be measured, for example, by using an alternating current impedance measurement method. The $\sigma_T$ of the garnet-type compound calculated by the above method is not particularly limited. From the viewpoint of application to all-solid lithium secondary batteries, the $\sigma_T$ at room temperature (for example, 30° C.) is preferably $1\times10^{-6}$ S/cm or more, more preferably $5\times10^{-6}$ S/cm or more, and even more preferably $1\times10^{-5}$ S/cm or more, and still more preferably $5\times10^{-5}$ S/an or more. The $\sigma_T$ value can be suitably changed by adjusting the compositional ratio of element $M^1$, element $M^2$, and element $M^3$, i.e., the proportions of the raw materials used in the production.

The activation energy ($E_a$) for lithium ionic conduction of the garnet-type compound can be calculated by evaluating the temperature dependency of $\sigma_T$ calculated by using the above method. Specifically, the activation energy for lithium ionic conduction of the garnet-type compound can be calculated from a slope of the graph (Arrhenius plot), which shows the temperature dependence of lithium ion conductivity, using Arrhenius equation: $\sigma=\sigma_0\exp(-E_a/RT)$ (wherein $\sigma$: lithium ion conductivity, $\sigma 0$: frequency factor, R: gas constant, and T: absolute temperature). The $E_a$ value of the garnet-type compound of the present invention is not particularly limited, but is preferably 42 kJ/mol or less, more preferably 38 kJ/mol or less, and even more preferably 34 kJ/mol or less, from the viewpoint of application to all-solid lithium secondary batteries in a wide temperature range. The $E_a$ value can be suitably changed by adjusting the compositional ratio of elements $M^1$, $M^2$, and $M^3$ in the garnet-type compound.

The garnet-type compound of the present invention can be used for any application using lithium ion conductivity. For example, the garnet-type compound of the present invention can be used for secondary batteries, fuel cells, and gas sensors. Among these, the garnet-type compound is preferably used for all-solid lithium secondary batteries, which are a type of secondary battery.

C. All-Solid Lithium Secondary Batteries

An embodiment of the all-solid lithium secondary batteries will now be described.

The all-solid lithium secondary battery according to this embodiment comprises a positive electrode layer containing a positive electrode active material, a negative electrode layer containing a negative electrode active material, and a solid electrolyte layer interposed between the positive electrode layer and the negative electrode layer. A feature of the all-solid lithium secondary battery is that at least one layer selected from the positive electrode layer, the negative electrode layer, and the solid electrolyte layer contains a garnet-type compound produced through the first and second steps above.

Each constituent of the all-solid lithium secondary battery according to this embodiment is explained below.

Positive Electrode Layer

The positive electrode layer is a layer containing at least a positive electrode active material, and optionally further containing at least one of lithium ion-conducting materials, electron conduction aids, and binding materials.

The lithium ion-conducting material contained in the positive electrode layer is preferably the above garnet-type compound. The content of the garnet-type compound in the positive electrode layer is not particularly limited. For example, the content of the garnet-type compound may be in the range of 0.1 volume % to 80 volume %, based on the total volume of the positive electrode layer. In particular, the content of the garnet-type compound is preferably 1 volume % to 60 volume %, and more preferably 10 volume % to 50 volume %. The thickness of the positive electrode layer is not particularly limited. For example, the thickness is preferably within the range of 0.1 μm to 1,000 μm. When the positive electrode layer has a thickness of less than 0.1 μm, increasing the capacity of the all-solid lithium secondary battery becomes difficult. When the positive electrode layer has a thickness of more than 1,000 μm, forming a uniform layer becomes difficult.

The positive electrode active material is not particularly limited as long as it is capable of electrochemically storing and releasing lithium ions. Using sulfur or lithium sulfide ($Li_2S$) having a high theoretical capacity is preferable from the viewpoint of increasing the capacity of the all-solid lithium secondary battery. From the viewpoint of increasing the operating voltage of the all-solid lithium secondary battery, Li-containing oxide materials may be used. Specific examples include layered rock salt-type oxides such as $LiCoO_2$, $LiMnO_2$, $LiNiO_2$, $LiVO_2$, $Li(Ni_xCo_yMn_z)O_2$ (x+y+z=1), and $Li(Ni_xCo_yAl_z)O_2$ (x+y+z=1); spinel oxides such as $LiMn_2O_4$ and $Li(Ni_{0.5}Mn_{1.5})O_4$; olivine phosphates such as $LiFePO_4$, $LiMnPO_4$, $LiNiPO_4$, and $LiCuPO_4$; and silicates such as $Li_2FeSiO_4$ and $Li_2MnSiO_4$. The materials described above may be used singly or in a combination of two or more.

The content of the positive electrode active material in the positive electrode layer may be preferably, for example, in the range of 10 volume % to 99 volume %, based on the total volume of the positive electrode layer. The content of the positive electrode active material is more preferably in the range of 20 volume % to 99 volume %. The positive electrode active material can be, for example, in the form of particles. The mean particle size is preferably in the range of, for example, 0.05 μm to 50 μm.

The positive electrode layer may contain, in addition to a positive electrode active material and a lithium ion-conducting material, at least one of electron conduction aids and binding materials. Materials with high electron conductivity are preferable as electron conduction aids. Examples include acetylene black, Ketjen black, carbon fiber, and the like. Examples of binding materials include polyvinylidene fluoride, polytetrafluoroethylene, polyvinyl alcohol, polyvinyl acetate, polymethylmethacrylate, polyethylene, and the like.

The positive electrode layer can be produced by mixing the constituent components (e.g., the above positive electrode active material, lithium ion-conducting material, electron conduction aid, and binding material) and forming the mixture. In this process, sintering may be performed, if necessary. The method for mixing the components for a positive electrode layer is not particularly limited, and any general powder technique can be used. In the powdering process, water or any organic solvents may be used as a dispersant. The methods for forming and sintering the mixture of the components for a positive electrode layer are also not particularly limited. Generally known forming and sintering methods can be used. The positive electrode layer may be formed on a solid electrolyte layer. In this case, the positive electrode layer and the solid electrolyte layer may be sintered together. Sintering together as used here refers to a method comprising forming one of "a lithium ion-conducting material constituting a solid electrolyte layer" and "a mixture of constituent components for a positive electrode layer" and then forming the other, optionally followed by pressing, and then sintering.

A positive electrode current collector for collecting a positive electrode layer can be disposed, for example, on the side opposite to the solid electrolyte layer side of the positive electrode layer. Examples of materials of the positive electrode current collector include stainless steel, aluminum, nickel, iron, carbon, and the like. Among these, stainless steel is preferable.

Negative Electrode Layer

The negative electrode layer is a layer containing at least a negative electrode active material, and optionally further containing at least one of lithium ion-conducting materials, electron conduction aids, and binding materials.

The lithium ion-conducting material contained in the negative electrode layer is preferably the above garnet-type compound. The content of the garnet-type compound in the negative electrode layer is not particularly limited. For example, the content of the garnet-type compound may be, for example, in the range of 0.1 volume % to 80 volume %, based on the total volume of the negative electrode layer. In particular, the content of the garnet-type compound is preferably in the range of 1 volume % to 60 volume %, and more preferably 10 volume % to 50 volume %. The thickness of the negative electrode layer is not particularly limited, and is preferably in the range of, for example, 0.1 μm to 1,000 μm.

The negative electrode active material is not particularly limited as long as it is capable of electrochemically storing and releasing lithium ions. Metal materials having a high theoretical capacity are preferable from the viewpoint of increasing the capacity of all-solid lithium secondary batteries. Examples of metal materials include metals such as Li, Si, Sn, and In, and alloys thereof. Among these, lithium metal is preferable because it has the highest theoretical capacity. Alternatively, Ti-based materials, such as titanium oxide and lithium titanate, which are excellent in batter reversibility, may be used. Examples of Ti-based materials include $TiO_2$, $H_2Ti_{12}O_{25}$, $Li_4Ti_5O_{12}$, and the like. Further, inexpensive carbon-based materials can also be used. Specific examples of carbon-based materials include natural graphite, artificial graphite, non-graphitizable carbon, graphitizable carbon, and the like. As the negative electrode active material, the materials mentioned above can be used singly or in any combination of two or more.

The content of the negative electrode active material in the negative electrode layer is preferably, for example, in the range of 10 volume % to 99 volume %, and more preferably 20 volume % to 99 volume %, based on the total volume of the negative electrode layer. The negative electrode active material may be, for example, in the form of particles, a foil, or a film. When the negative electrode active material is in the form of particles, the mean particle size is preferably, for example, 0.05 μm to 50 μm.

In addition to a negative electrode active material and a lithium ion-conducting material, the negative electrode layer may contain at least one of electron conduction aids and binding materials. Examples of electron conduction aids and binding materials may be the same as those for the positive layer mentioned above.

The negative electrode layer can be produced by mixing the constituent components (e.g., the above negative electrode active material, lithium ion-conducting material, electron conduction aid, and binding material) and forming the mixture. In this process, sintering may be performed, if necessary. The method for mixing the constituent components for a negative electrode layer is not particularly limited, and any general powder technique can be used. In the powdering process, water or any organic solvent may be used as a dispersant. Further, the method for forming a mixture of the constituent components for a negative electrode layer and sintering the resulting mixture are also not particularly limited. Generally known forming and sintering methods can be used. When the negative electrode active material is in the form of a foil or a film, a negative electrode layer may be formed by the above method for forming a negative electrode layer, or the negative electrode active material itself may be regarded as a negative electrode layer. Alternatively, the negative electrode layer may be formed on a solid electrolyte layer. In this case, the negative electrode layer and the solid electrolyte layer can be sintered together. Sintering together here refers to a method comprising first forming one of "a lithium ion-conducting material constituting a solid electrolyte layer" described below and "a mixture of constituent components for a negative electrode layer" and then forming the other, optionally followed by pressing, and then sintering.

A negative electrode current collector for collecting a negative electrode layer can be disposed, for example, on the side opposite to the solid electrolyte layer side of the negative electrode layer. Examples of materials for the negative electrode current collector include stainless steel, copper, nickel, iron, carbon, and the like. Among these, stainless steel is preferable.

Solid Electrolyte Layer

The solid electrolyte layer is a layer interposed between a positive electrode layer and a negative electrode layer and comprising a lithium ion-conducting material. The lithium ion-conducting material contained in the solid electrolyte layer is not particularly limited as long as it has lithium ion conductivity.

The lithium ion-conducting material contained in the solid electrolyte layer is preferably a garnet-type compound described above. The content of the garnet-type compound in the solid electrolyte layer is not particularly limited as long as the electron conductivity is fully suppressed. For example, the content of the garnet-type compound is preferably within the range of 50 volume % to 100 volume %.

The solid electrolyte layer can contain a lithium ion-conducting material other than the garnet-type compound. Specific examples of such materials include NASICON compounds such as $Li_{1.3}Al_{0.3}Ti_{1.7}(PO_4)_3$, $Li_{1.5}Al_{0.5}Ge_{1.5}(PO_4)_3$, $LiZr_2(PO_4)_3$, $Li_{1.2}Ca_{0.1}Zr_{1.9}(PO_4)_3$, and $Li_{1.15}Y_{0.15}Zr_{1.85}(PO_4)_3$; lithium ion-conducting oxide glasses such as $Li_2O$—$B_2O_3$ glass, $Li_2O$—$SiO_2$ glass, $Li_2O$—$P_2O_5$ glass, and $Li_{2.9}PO_{3.3}N_{0.46}$ glass (LIPON); and lithium ion-conducting sulfide glasses such as $Li_2S$—$B_2S_3$ glass, $Li_2S$—$SiS_2$ glass, and $Li_2S$—$P_2S_5$ glass. Lithium ion-conducting oxide glass and lithium ion-conducting sulfide glass may also be crystallized and used as glass ceramic materials.

The thickness of the solid electrolyte layer is not particularly limited as long as it is a thickness that can prevent shorting of the all-solid lithium secondary battery. For example, the thickness may be in the range of 0.1 μm to 1,000 μm. In particular, the thickness is preferably in the range of 0.1 μm to 300 μm.

The solid electrolyte layer can be produced by forming the lithium ion-conducting material described above and sintering. The methods for forming and sintering the lithium ion-conducting material constituting a solid electrolyte layer are not particularly limited, and generally known forming and sintering methods can be used. The sintering temperature is not particularly limited. For example, when the lithium ion-conducting material is the above garnet-type compound, the sintering temperature is preferably in the range of 700 to 1,200° C., more preferably 700 to 1,100° C., and even more preferably 700 to 1,000° C. The sintering density of the solid electrolyte layer is preferably 60% or more, more preferably 70% or more, even more preferably 80% or more, still even more preferably 90% or more, relative to the theoretical density. The higher the sintered density, the more effectively the resistance can be suppressed. When the solid electrolyte layer is sintered, the solid electrolyte layer is preferably sintered together with the above positive electrode layer or negative electrode layer, or both. This is because sintering together can reduce the resistance of the layer interface.

Structure of the all-Solid Lithium Secondary Battery

The all-solid lithium secondary battery may be, for example, coin-shaped, laminar, cylindrical or rectangular.

The method for producing the all-solid lithium secondary battery according to this embodiment is not particularly limited as long as the method can produce the above all-solid lithium secondary battery. Methods similar to general methods for producing an all-solid lithium secondary battery can be used. For example, the all-solid lithium secondary battery according to this embodiment can be produced by stacking the positive electrode layer, solid electrolyte layer, and negative electrode layer in this order.

The all-solid lithium secondary battery according to this embodiment, which contains the garnet-type compound, can suppress the internal resistance of the battery due to a high lithium ion conductivity of the garnet-type compound, and thus has high battery performance, such as in rate characteristics. Containing the garnet-type compound in the form of fine particles in the electrode layer ensures a very good interface with an electrode active material. Accordingly, ion conducting pathways to the electrode active material are constructed satisfactorily, and the ratio of the electrode active material that fails to contribute to the battery reaction is reduced, thus enhancing the energy density of the battery.

EXAMPLES

The present invention is described below in more detail with reference to Examples. However, the scope of the invention is not limited to these Examples. In the Examples, all percentages refer to percent by weight concentrations unless otherwise specified.

Raw Materials

In Examples 1 to 6 described below, the following zirconium carbonate complex, $M^1$ source, $M^2$ source, $M^3$ source, and Li source were used.

Zirconium Carbonate Complex

In Examples 1 to 5, a basic zirconium carbonate (Zr$(OH)_{3.2}(CO_3)_{0.4} \cdot 7H_2O$, produced by Daiichi Kigenso Kagaku Kogyo Co., Ltd.) was selected as a Zr source for obtaining a first raw material. This compound, ammonium hydrogen carbonate as a carbonate species, and tartaric acid as a chelating agent were dissolved in pure water. Subsequently, the pH of the solution was adjusted to 8.0 by using ammonium water to prepare an aqueous solution of ammonium zirconium carbonate (hereinafter simply referred to as the "aqueous AZC solution"), which was used as a "solution containing a zirconium carbonate complex" (first raw material). The molar ratio of carbonate species to Zr (number of moles of carbonate species/number of moles of Zr) was set to 6.59, and the molar ratio of tartaric acid to Zr (number of moles of tartaric acid/number of moles of Zr) was set to 0.06. This aqueous AZC solution is an aqueous zirconium carbonate-$NH_4$ complex solution having a Zr concentration of 1.96%.

In Example 6, a solution containing a zirconium carbonate complex, used as a first raw material, was prepared in the following manner. First, a basic zirconium carbonate, ammonium hydrogen carbonate, and tartaric acid were dissolved in pure water to prepare an aqueous AZC solution. The molar ratio of carbonate species to Zr in this aqueous AZC solution was set to 6.59, and the molar ratio of tartaric acid to Zr was set to 0.06. The Zr concentration was 14.98%. Subsequently, tetramethyl ammonium hydroxide (($CH_3)_4N$(OH), produced by Tama Chemicals Co., Ltd., a 60% aqueous solution), choline hydroxide (($CH_3)_3N$($CH_2CH_2OH$)(OH), produced by Tama Chemicals Co., Ltd., a 4% aqueous solution), and niobium pentachloride ($NbCl_5$, produced by Mitsuwa Chemicals Co., Ltd.), and pure water were added to this aqueous AZC solution to prepare an aqueous AZC solution containing Nb.

That is, the aqueous AZC solution, used as a first raw material in Example 6, is an aqueous zirconium carbonate complex solution containing $NH_4$ ions, $(CH_3)_4N^+$ ions, and $(CH_3)_3N(CH_2CH_2OH)^+$ ions as counter-cations, and containing Nb as element $M^3$. In this solution, the molar ratio of carbonate species to Zr (number of moles of carbonate species/number of moles of Zr) was 12.77; the molar ratio of tartaric acid to Zr (number of moles of tartaric acid/number of moles of Zr) was 0.06; the molar ratio of tetramethyl ammonium hydroxide to Zr (number of moles of tetramethyl ammonium hydroxide/number of moles of Zr) was 6.46; and the molar ratio of choline hydroxide to Zr (number of moles of choline hydroxide/number of moles of Zr) was 0.24. The proportion of Nb to Zr used, in terms of molar ratio (number of moles of Nb/number of moles of Zr), was 0.14. The Zr concentration was 2.60%, and the pH of the solution was 8.6.

The zirconium compound usually contains a hafnium component as an inevitable component. All of the above aqueous AZC solutions and garnet-type compounds obtained in Examples 1 to 6 below contain hafnium at a molar ratio to zirconium (number of moles of Hf/number of moles of Zr) of 0.03. In the obtained garnet-type compounds, the hafnium component was not detected as an impurity compound and considered to be present at the zirconium position in the crystal structure. Accordingly, in Examples 1 to 6, the Zr concentration is indicated as the sum of the zirconium concentration and hafnium concentration unless otherwise specified. Zr in the composition ratio refers to the sum of zirconium and hafnium (this also applies to Zr in the above Hf/Zr).

$M^1$ Source

In Examples 1 to 6, an aqueous solution of $La(NO_3)_3$ (La concentration: 16.23%) was used as an $M^1$ source. In other words, element $M^1$ is La.

$M^2$ Source

In Examples 1 to 5, an aqueous solution of $A(NO_3)_3$ (Al concentration: 4.43%) was used as an l2 source. In other words, element $M^2$ in Examples 1 to 5 was Al.

In Example 6, nothing was used as an $M^2$ source. In other words, the garnet-type compound obtained in Example 6 does not contain element $M^2$.

$M^3$ Source

As described above, a zirconium carbonate complex contains a trace of hafnium (Hf) at a ratio to zirconium within a specific range. In Examples 1 to 5, Hf contained in the zirconium carbonate complex was used as an $M^3$ source. In other words, element $M^3$ is Hf in Examples 1 to 5.

In Example 6, as described above, the aqueous AZC solution, which is an aqueous solution containing a zirconium carbonate complex (first raw material), contains Nb in addition to Hf. In other words, element $M^3$ in Example 6 is Hf and Nb.

Li Source $LiNO_3$ (Examples 1 to 3 and 6) or $Li_2CO_3$ (Examples 4 and 5) was used as a Li source.

Example 1

First Step

Production of Precipitate 2182.7 g of an aqueous AZC solution as a first raw material was stirred at room temperature. A mixed solution (second raw material) of 602.9 g of an aqueous $La(NO_3)_3$ solution as an $M^1$ source (also referred to as a La source) and 35.79 g of an aqueous $Al(NO_3)_3$ solution as an $M^2$ source (also referred to as an Al source) was added dropwise thereto at a rate of 15 ml/min to form a precipitate. The proportion of La to Zr used was adjusted to 1.50 in terms of molar ratio (number of moles of La/number of moles of Zr). The proportion of Al to Zr used was adjusted to 0.125 in terms of molar ratio (number of moles of Al/number of moles of Zr). As described above, the aqueous AZC solution contains Hf at a molar ratio to Zr (number of moles of Hf/number of moles of Zr) of 0.03.

While the slurry containing the precipitate thus obtained was heated at 90° C., stirring was continued for 2 hours. When the slurry was stirred at 90° C. for about 10 minutes, a thickening phenomenon was observed. This is considered to be due to the gelling property of the aqueous AZC solution upon heating. It is thought that a homogenous La—Zr—Al precipitate (containing Hf) with no compositional deviation is obtained because this gelling phenomenon allows ion species not completely precipitated to be homogeneously integrated into a gel. After the slurry was stirred for 2 hours, suction filtration was performed. The filtrate was washed with 2,000 ml of pure water, and water was removed to obtain a precipitate. The chemical composition analysis results show that the obtained precipitate had a La concentration of 40.0%, a Zr concentration of 17.3%, and an Al concentration of 0.63%. Since the composition ratio (molar ratio) was La:Zr:Al=3.0:2.0:0.24, the obtained product was found to have nearly the same composition as the feed composition.

Second Step: Production of Garnet-Type Compound

A 60.0 g portion of the La—Zr—Al precipitate finally obtained in the first step was taken and added to 174.5 g (Li content: 2.50 g) of an aqueous $LiNO_3$ solution (third raw material) as a Li source, and dispersed by stirring. In this case, the molar ratio of the constituent elements was La:Zr:Al:Li=3.0:2.0:0.24:6.25. The solids concentration of the constituent elements in the dispersion, calculated in terms of oxides, was 20.6%. This dispersion was in the form of a high-concentration slurry.

Next, this dispersion was stirred at room temperature for 2 hours and then evaporated to dryness by drying at 120° C. for 48 hours using a stationary dryer, thus obtaining 81.5 g of a white dry mass. 10.0 g of this dry mass was fired in an air atmosphere at 900° C. for 20 hours. The whole amount of the obtained fired powder was collected and ground using an agate mortar to obtain a garnet-type compound.

Example 2

10.0 g of the white dry mass obtained in the second step of Example 1 was fired in an air atmosphere at 850° C. for 25 hours. The fired product was then subjected to the same step as in Example 1 to obtain a garnet-type compound of Example 2.

Example 3

10.0 g of the white dry mass obtained in the second step of Example 1 was fired in an air atmosphere at 800° C. for 40 hours. The fired product was then subjected to the same step as in Example 1 to obtain a garnet-type compound.

Example 4

The precipitate obtained in the first step of Example 1 was subjected to the following second step. First, 8.00 g of the precipitate and 1.77 g of $Li_2CO_3$ as a Li source were weighed. In this case, the molar ratio of the constituent elements was La:Zr:Al:Li=3.0:2.0:0.24:6.25 as in Examples 1 to 3. Subsequently, after the weighed precipitate and $Li_2CO_3$ were fully dry-mixed in an agate mortar, the dry mixture was fired in an air atmosphere at 900° C. for 20 hours. The whole amount of the obtained fired powder was collected and ground using an agate mortar to obtain a garnet-type compound.

Example 5

The precipitate obtained in the first step of Example 1 was subjected to the following second step. First, 10.00 g of the precipitate and 2.22 g of $Li_2CO_3$ as a Li source were weighed. In this case, the molar ratio of the constituent elements was La:Zr:Al:Li=3.0:2.0:0.24:6.25, as in Examples 1 to 4. Subsequently, after the weighed precipitate and $Li_2CO_3$ were fully dry-mixed in an agate mortar, the mixture was placed into an 80-ml zirconia pot, and zirconia balls (5-mm diameter, 250 balls) were added thereto. This pot was attached to a planetary ball mill (Pulverisette P-6, produced by Fritsch GmbH), and ball mill blending was performed at a table revolution rate of 400 rpm for 2 hours to obtain a fine powder mixture. The obtained fine powder mixture was fired in an air atmosphere at 800° C. for 40 hours. The whole amount of the obtained fired powder was ground using an agate mortar to prepare a garnet-type compound.

Example 6

First Step: Production of Precipitate

After 351.5 g of an aqueous AZC solution containing Nb was stirred at room temperature, an aqueous $La(NO_3)_3$ solution (second raw material) as a La source was added dropwise at a rate of 7 ml/min to form a precipitate. In this step, the aqueous $La(NO_3)_3$ solution was used by being diluted beforehand so that the proportion of La to Zr used was 1.71 in terms of molar ratio. As described above, this aqueous AZC solution contains Hf at a molar ratio to Zr (number of moles of Hf/number of moles of Zr) of 0.03 and contains Nb at a molar ratio to Zr of 0.14. That is, the proportion of element $M^3$ to Zr used is 0.17 in terms of molar ratio.

A slurry containing the precipitate thus obtained was heated to 96° C. and stirred for 2 hours. The slurry thickened by heating was suction-filtered and washed with 1,000 ml of pure water to obtain a precipitate. The compositional analysis results show that the obtained precipitate had a La concentration of 8.91%, a Zr concentration of 3.39%, and an Al concentration of 0.46%, and their composition ratio (molar ratio) was La:Zr:Nb=3.0:1.74:0.24. Accordingly, the obtained product was found to have nearly the same composition as the feed composition.

Second Step: Production of Garnet-Type Compound

A 236.5 g portion of the La—Zr—Nb precipitate finally obtained in the first step was taken and added to 152.3 g (Li content: 2.37 g) of an aqueous solution containing $LiNO_3$ (third raw material) as a Li source, and dispersed by stirring.

In this case, the molar ratio of the constituent elements was La:Zr:Nb:Li =3.0:1.74:0.24:6.75. The solids concentration of the constituent elements in the dispersion was 10.9%, calculated in terms of oxides.

Next, this dispersion was stirred at room temperature for 2 hours and then evaporated to dryness by drying at 90° C. for 36 hours using a stationary dryer to obtain 98.3 g of a white dry mass. 14.0 g of this dry mass was calcined in an air atmosphere at 650° C. for 10 hours, then ground using an agate mortar, and fired in an air atmosphere at 900° C. for 2 hours. The whole amount of the obtained fired powder was collected and ground using an agate mortar to obtain a garnet-type compound.

Comparative Example 1

To clearly demonstrate the effect of the present invention, a precipitate was produced using a usual neutralization-coprecipitation method in place of performing the first step preformed in the Examples. This precipitate was subjected to the same second step as in Example 1 to prepare a garnet-type compound of Comparative Example 1. The composition of the precipitate was the same as that of the precipitates obtained in Examples 1 to 5. In Comparative Example 1, $ZrO(NO_3)_2$ was used in place of the aqueous AZC solution. This aqueous $ZrO(NO_3)_2$ solution had a Zr concentration of 14.75% and a pH of 1.7. The aqueous $ZrO(NO_3)_2$ solution also contains hafnium at a molar ratio to zirconium (number of moles of Hf/number of moles of Zr) of 0.03. In the obtained garnet-type compound, no hafnium component was detected as an impurity compound and considered to be present at the zirconium position in the crystal structure. Accordingly, in this Comparative Example as well, the Zr concentration was indicated as the sum of the zirconium concentration and the hafnium concentration unless otherwise specified. Zr in the composition ratio of the obtained garnet-type compound refers to the sum of zirconium and hafnium (this also applies to Zr in the above Hf/Zr). The method for producing the garnet-type compound in Comparative Example 1 is described below in detail.

Production of the Precipitate by the Neutralization-Coprecipitation Method

First, 73.5 g of an aqueous $ZrO(NO_3)_2$ solution, 152.6 g of an aqueous $La(NO_3)_3$ solution as a La source, 9.06 g of an aqueous $Al(NO_3)_3$ solution as an Al source were weighed. Here, the proportion of La to Zr used was 1.50 in terms of molar ratio (number of moles of La/number of moles of Zr), and the proportion of Al to Zr used was 0.125 in terms of molar ratio (number of moles of Al/number of moles of Zr). As stated above, the aqueous $ZrO(NO_3)_2$ solution contains Hf at a molar ratio to Zr (number of moles of Hf/number of moles of Zr) of 0.03.

Next, the weighed aqueous solutions were mixed and diluted with 264.8 g of pure water. While this mixed aqueous solution was stirred, 125 g of 25 wt. % aqueous ammonia was added dropwise thereto at a rate of 10 ml/min to form a precipitate. After the slurry containing the obtained precipitate was further stirred at room temperature for 1.5 hour, suction filtration was performed. The filtrate was washed with 1,000 ml of pure water and water was removed to obtain a precipitate. The compositional analysis results show that the obtained precipitate had a La concentration of 43.1%, a Zr concentration of 18.8%, and an Al concentration of 0.70% and that the composition ratio (molar ratio) was La:Zr:Al=3.0:2.0:0.25, which was nearly the same composition as that of the precipitate obtained in Example 1.

Second Step: Production of Garnet-Type Compound

A 40.0 g portion of the precipitate obtained in the first step was taken and added to 125.2 g of an aqueous $LiNO_3$ solution as a Li source (Li content: 1.79 g), and dispersed by stirring. In this case, the molar ratio of the constituent elements was La:Zr:Al:Li=3.0:2.0:0.25:6.25. Subsequently, this dispersion was stirred at room temperature for 2 hours and then dried at 120° C. for 48 hours to obtain 56.4 g of a white dry mass. A 10.0 g portion of this dry mass was fired at 900° C. in an air atmosphere for 20 hours. The whole amount of the obtained fired powder was collected and ground using an agate mortar to obtain a garnet-type compound.

Comparative Example 2

A white dry mass was produced in the same manner as in Comparative Example 1, and 10.0 g of this white dry mass was fired at 800° C. in an air atmosphere for 40 hours. The obtained fired product was subjected to the same step as in Comparative Example 1 to obtain a garnet-type compound.

Table 1 shows the conditions for producing the garnet-type compounds in Examples 1 to 6 and Comparative Example 1 and 2 (the Zr source and Li source used, the method for producing a mixture in the second step, and firing conditions in the second step). Table 1 also shows the results of powder X-ray diffraction (XRD) measurement described below.

TABLE 1

| Example, Comp. Ex. | Zr source | Li source | Method for preparing the mixture in the second step | Firing conditions in the second step Temperature (° C.) | Time (hour) | XRD measurement Results b/a[2] | Single phase[3] |
|---|---|---|---|---|---|---|---|
| Example 1 | AZC[1] | $LiNO_3$ | Evaporation to dryness | 900 | 20 | 0.0096 | A |
| Example 2 | AZC | $LiNO_3$ | Evaporation to dryness | 850 | 25 | 0.0081 | A |
| Example 3 | AZC | $LiNO_3$ | Evaporation to dryness | 800 | 40 | 0.0117 | A |
| Example 4 | AZC | $Li_2CO_3$ | Dry blending | 900 | 20 | 0.0134 | A |
| Example 5 | AZC | $Li_2CO_3$ | Dry blending + ball milling | 800 | 40 | 0.0435 | A |
| Example 6 | AZC | $LiNO_3$ | Dry blending | 900 | 2 | 0.0288 | A |

TABLE 1-continued

| Example, Comp. Ex. | Zr source | Li source | Method for preparing the mixture in the second step | Firing conditions in the second step Temperature (° C.) | Time (hour) | XRD measurement Results b/a[2] | Single phase[3] |
|---|---|---|---|---|---|---|---|
| Comp. Ex. 1 | ZrO(NO$_3$)$_2$ | LiNO$_3$ | Evaporation to dryness | 900 | 20 | 0.119 | B |
| Comp. Ex. 2 | ZrO(NO$_3$)$_2$ | LiNO$_3$ | Evaporation to dryness | 800 | 40 | 0.135 | B |

[1] AZC: ammonium zirconium carbonate
[2] a is the maximum peak intensity at 2θ = 16.0 to 17.0° in the XRD pattern, and b is the maximum peak intensity at 2θ = 28.5 to 28.7 in the XRD pattern.
[3] "A" indicates that a single phase of an LLZ garnet-type compound was obtained. "B" indicates that a single phase of an LLZ garnet-type compound was not obtained.

The garnet compounds obtained above in the Examples and Comparative Examples were evaluated for the crystal structure, morphology of fine particles, lithium ion conductivity, and productivity. The evaluation results are described below in detail.

Evaluation
Confirmation of Crystal Structure

The garnet-type compounds obtained in the Examples and Comparative Examples were subjected to X-ray powder diffraction measurement to confirm the crystal structure and single phase of each compound. A RINT2500 X-ray diffractometer manufactured by Rigaku Corporation was used for the measurement. Measurement conditions: measurement was performed using a Cu-Kα radiation source at a tube voltage of 50 kV, a tube current of 300 mA, and a scan speed of 4° 2θ/min.

As shown in FIG. 1, the sample of Example 1 exhibited a diffraction pattern similar to 045-0109 of the ICDD powder diffraction file. This confirmed that a cubic LLZ garnet-type compound was formed. Although there are a slight peak shift and change in the peak intensity ratio, these are considered to be due to the difference in constituent elements.

Figure 2:
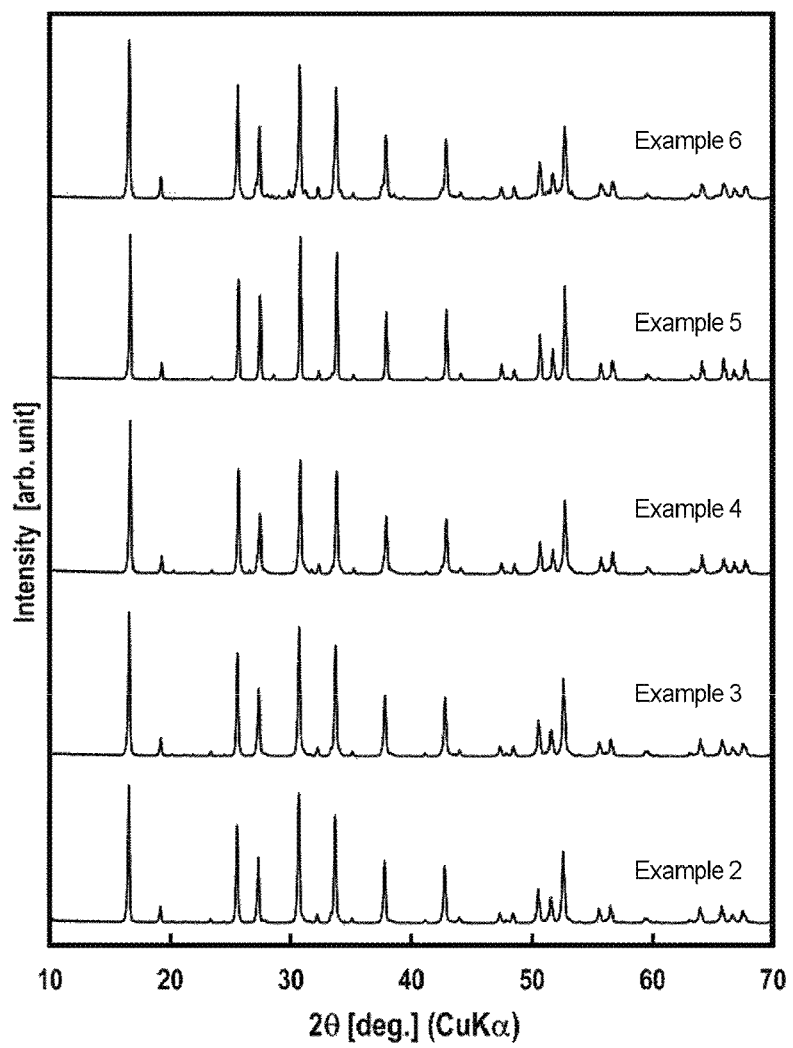
FIG. 2 shows the results (XRD patterns) of powder X-ray diffraction measurement of the garnet-type compounds obtained in Examples 2 to 6.
Figure 3:
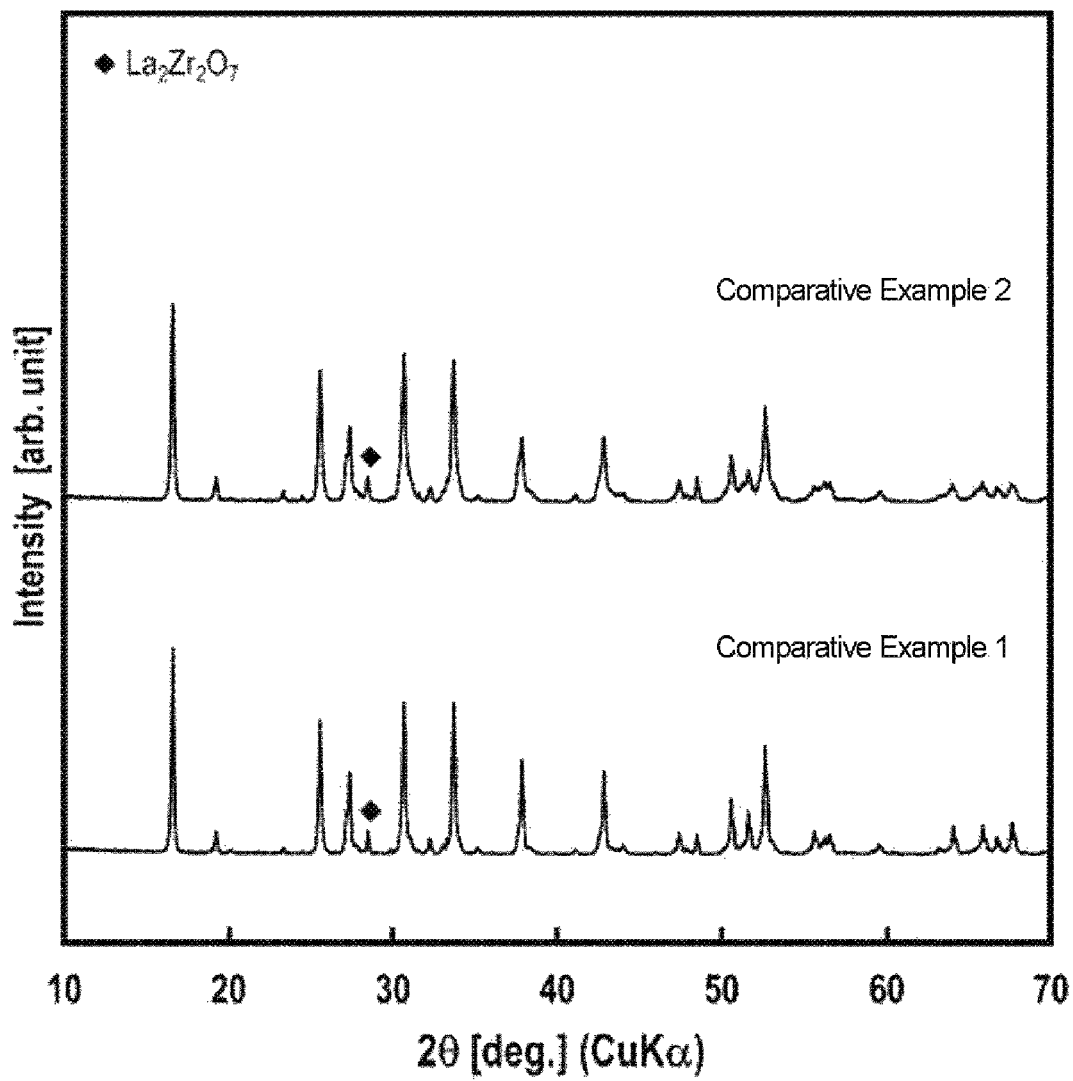
FIG. 3 shows the results (XRD patterns) of powder X-ray diffraction measurement of the garnet-type compounds obtained in Comparative Examples 1 and 2.

FIGS. 2 and 3 show that as in Example 1, the samples obtained in Examples 2 to 6 and Comparative Examples 1 and 2 also exhibited diffraction patterns similar to that of 045-0109 in the ICDD powder diffraction file. Thus, the garnet-type compounds obtained in Examples 2 to 6 and Comparative Example 1 and 2 were also confirmed to be cubic LLZ garnet-type compounds. In the samples obtained in Comparative Examples 1 and 2, however, a peak of La$_2$Zr$_2$O$_7$ as an impurity phase was clearly observed.

Confirming Whether the Compound is a Single Phase

It has been reported that in the process of producing a cubic LLZ garnet-type compound, La$_2$Zr$_2$O$_7$ is often produced as an impurity phase. This is considered to occur because La$_2$Zr$_2$O$_7$ has a cubic pyrochlore structure and is easily produced when Li is lost from LLZ having the same cubic garnet-type structure. It is also thought that when elements are not homogeneously dispersed in a reaction product, the Li composition in the sample may vary and La$_2$Zr$_2$O$_7$ is thus easily formed.

As an index for determining whether the desired cubic LLZ garnet compound is obtained as a substantially single phase, the present inventors invented the following method using the results of X-ray diffraction measurement. Specifically, in an XRD pattern that is similar to the diffraction pattern of 045-0109 in the ICDD powder diffraction file, the following values, a and b, are read out: value a (unit: cps) is defined as the maximum peak intensity in the range of 2θ=16.0 to 17.0°, where peaks derived from a cubic garnet-type compound are characteristically observed, whereas value b (unit: cps) is defined as the maximum peak intensity in the range of 2θ=28.5 to 28.7°, where peaks derived from La$_2$Zr$_2$O$_7$ are characteristically observed. In this measurement, when the peak intensity ratio (b/a) is 0.05 or less, it can be determined that a substantially single phase of a cubic LLZ garnet-type compound was obtained. When the peak intensity ratio (b/a) is more than 0.05, it can be determined that a considerable amount of La$_2$Zr$_2$O$_7$ was present as an impurity phase and a cubic LLZ garnet-type compound was not obtained as a substantially single phase.

Table 1 shows the peak intensity ratio (b/a) and the presence or absence of a single phase. Table 1 clearly shows the following. In Examples 1 to 6, the peak intensity ratio (b/a) was less than 0.05, and a substantially single phase of an LLZ garnet-type compound was obtained. In contrast, in both of Comparative Examples 1 and 2, the peak intensity ratio (b/a) was more than 0.1, and an LLZ garnet-type compound was not obtained as a substantially single phase.

In fact, FIG. 3 clearly shows that in each sample of Comparative Examples 1 and 2, a peak derived from La$_2$Zr$_2$O$_7$ as an impurity phase (indicated by black diamonds (♦) in FIG. 3) was observed. A comparison between Example 1 and Comparative Example 1 and a comparison between Example 3 and Comparative Example 2 show that although the LLZ garnet-type compounds were produced using the same Li source under the same firing conditions, a substantially single phase of an LLZ garnet-type compound was successfully obtained by using AZC as a Zr source, whereas a single phase of an LLZ garnet-type compound was not obtained by using ZrO(NO$_3$)$_2$ as a Zr source.

The above results prove that the method for producing a garnet-type compound using AZC as shown in Examples 1 to 6 is an excellent manufacturing method that can produce a substantially single phase of an LLZ garnet-type compound.

Observation of Microparticle Morphology

Scanning electron microscopy was performed on the garnet compounds obtained in Example 1 and Comparative Example 1 to evaluate particle morphology.

Figure 4:
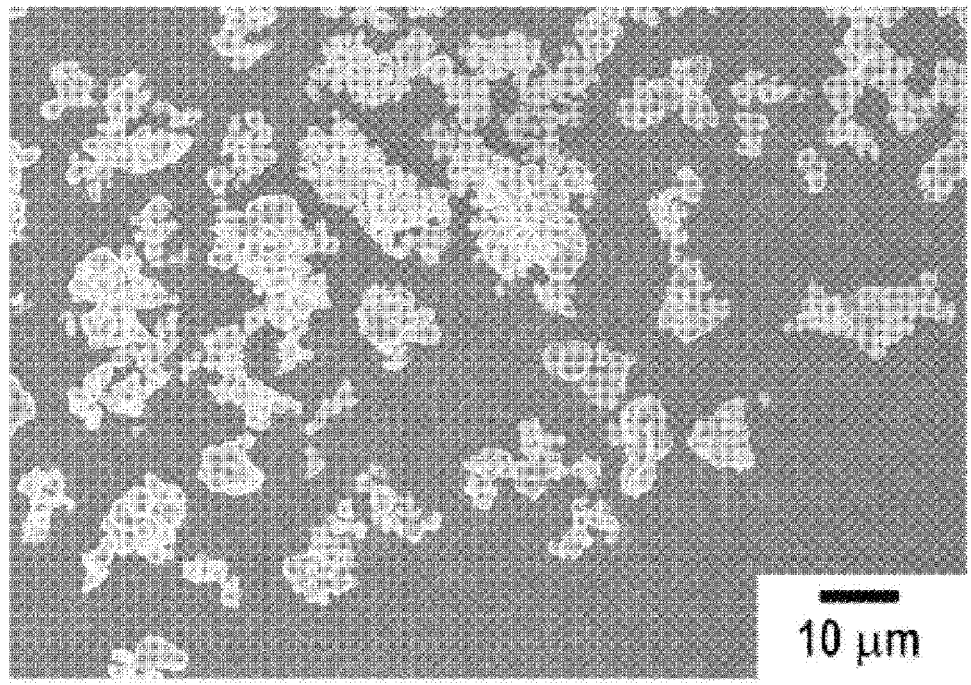
FIG. 4 is a scanning electron micrograph of the garnet-type compound obtained in Example 1.
Figure 5:
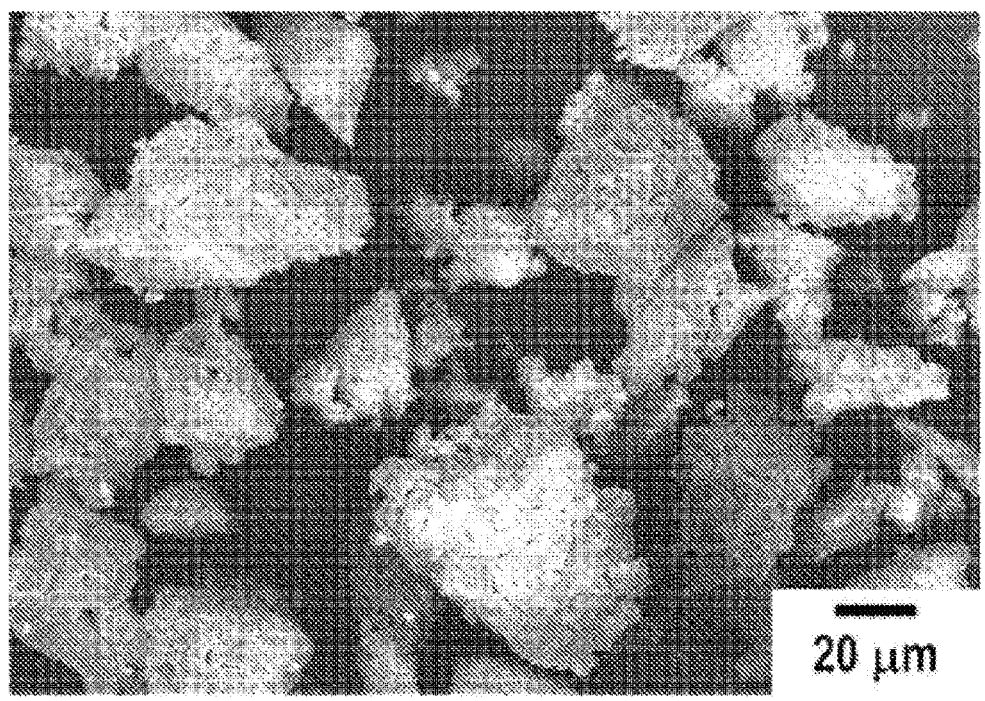
FIG. 5 is a scanning electron micrograph of the garnet-type compound obtained in Comparative Example 1.

FIGS. 4 and 5 show scanning electron micrographs of the garnet-type compound obtained in Example 1 and the scanning electron micrographs of garnet-type compound obtained in Comparative Example 1. The particle morphology of the garnet-type compounds obtained in Examples 2 to 6 were similar to that of the garnet-type compound obtained in Example 1. The particle morphology of the garnet-type compound obtained in Comparative Example 2 was similar to that of the garnet-type compound obtained in Comparative Example 1.

FIG. 4 shows that the garnet-type compound obtained in Example 1 is in a loosely agglomerated form of primary particles with a particle size of about 1 to 8 μm. In contrast, FIG. 5 shows that the garnet-type compound obtained in Comparative Example 1 is in the form of coarse particles having a particle size of more than 20 μm. Accordingly, the results prove that the production method of the Example comprising the first step and the second step can produce an LLZ garnet-type compound in the form of fine particles, and is an excellent method in this respect. Although the reason why there is such a great difference between Example 1 and Comparative Example 1 in morphology of the obtained particles is uncertain, the following can be speculated. When AZC is used as a Zr source and the first step is performed for obtaining a La—Zr—Al precipitate, zirconium carbonate ions, which are anionic, are conjugated to La or Al ions, which are cations, to form precipitates at close positions on the atomic scale. Therefore, fine precipitates having constituent elements uniformly dispersed therein are obtained. As a result, when a Li source was added and firing was performed in the second step, a garnet-type compound was obtained in the form of fine particles. In contrast, when $ZrO(NO_3)_2$ is used as a Zr source, La, Zr, and Al ions (cations) are all precipitated as hydroxides by a usual neutralization-coprecipitation method. Due to a great difference in the precipitation pH of each cationic species, segregation tends to occur easily, thus producing a precipitate in the form of coarse particles. As a result, the garnet-type compound was also obtained in the form of coarse particles.

Lithium Ion Conductivity

A sintered product was produced using the garnet-type compound obtained in Example 1. The resistance of the sintered product was determined by an alternating-current impedance method to calculate the lithium ion conductivity of the garnet-type compound (the total lithium ion conductivity $\sigma_T$ of the bulk component and the grain boundary component).

First, a powder of the garnet-type compound obtained in Example 1 was molded into a cylindrical shape using a cold press (160 MPa) and heated at 1,230° C. for 12 hours to obtain a sintered product (diameter: 1.785 cm, thickness: 0.230 cm, relative density: 85% (calculated based on 5.1 g/cm³ as the theoretical density)). The heat treatment was performed in an alumina crucible. To prevent the volatilization of Li, the powder of Example 1 was placed on the bottom of the crucible, and the molded product was disposed on the powder layer. The molded product was further covered with the powder of Example 1. Next, a conductive carbon paste was applied to both surfaces of the obtained cylindrical sintered product, and dried to form an electrode. This was placed and fixed between stainless steel plates connected to a platinum wire. The resulting product was maintained in a thermostatic bath in an air atmosphere to perform an alternating-current impedance measurement. As the measuring equipment, a frequency response analyzer manufactured by Solartron (Model 1255B) and a potentio galvanostat (Model 1287) were used in combination. The measurement conditions were a frequency domain of 1 Hz to 1 MHz and a temperature range of 30° C. to 70° C.

Figure 6:
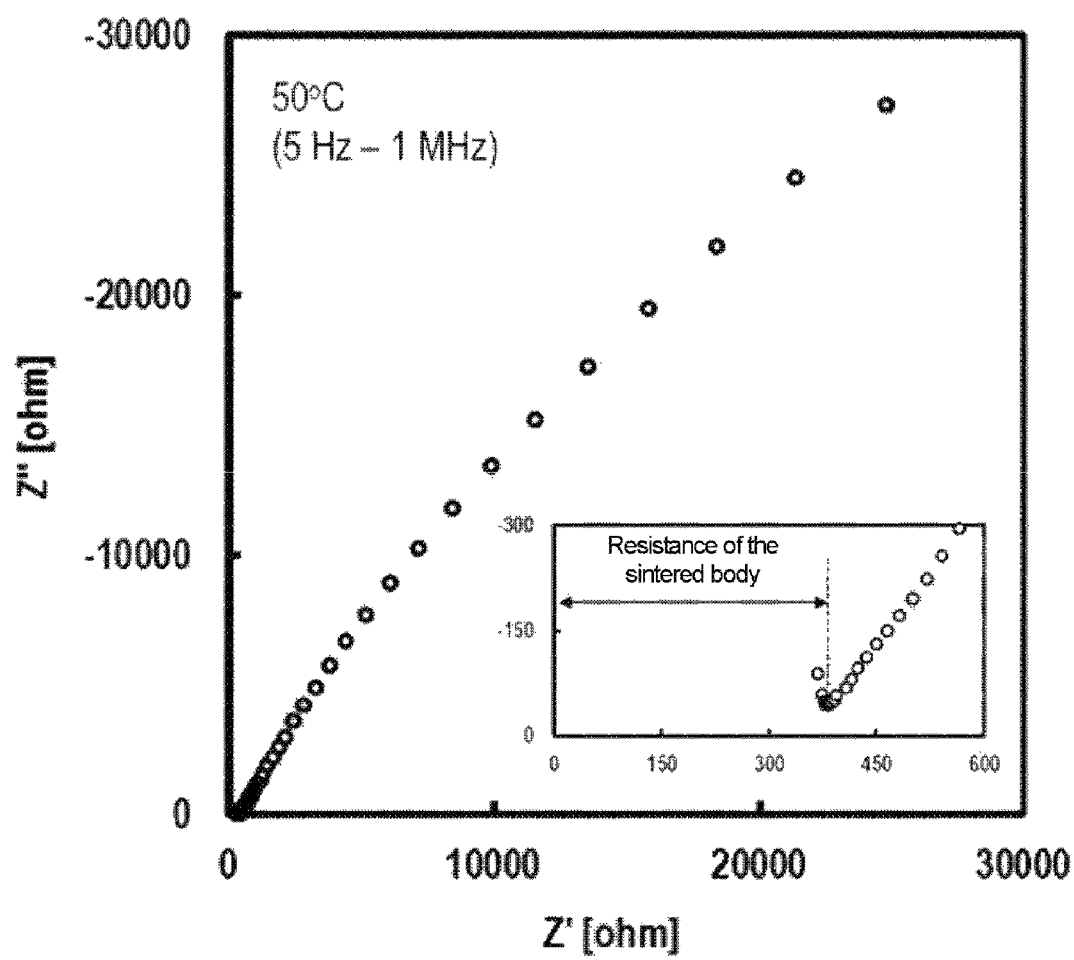
FIG. 6 shows one example of the results (complex impedance plots) of measuring the resistance of the sintered body of the garnet-type compound obtained in Example 1 by using an alternating-current impedance method. The inset of the graph is an enlarged view of a high-frequency region.

FIG. 6 shows the results of alternating current impedance measurement (complex impedance plots) at 50° C. as an example. Similar behaviors as in FIG. 6 were observed at other measurement temperatures. The resistance of the sintered product was observed without the separation of the bulk component and the grain boundary component. Accordingly, as shown in the insert of FIG. 6, the resistance of the sintered body (total resistance including the bulk component and the grain boundary component) of the sintered product was read out, and the lithium ion conductivity ($\sigma_T$) of the garnet-type compound was calculated.

Figure 7:
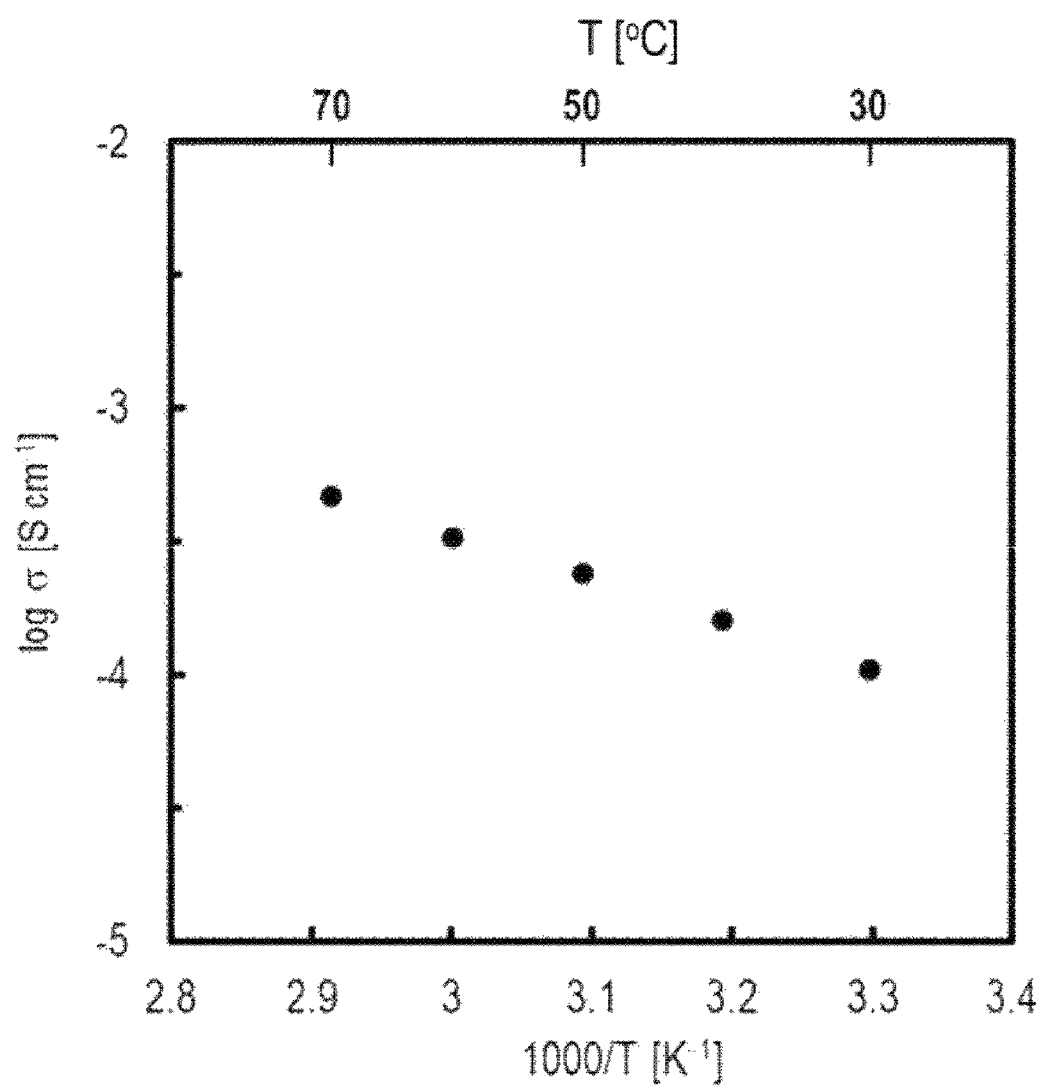
FIG. 7 is a graph (Arrhenius plot) showing the temperature dependency of lithium ion conductivity of the garnet-type compound obtained in Example 1.

FIG. 7 is a graph (Arrhenius plots) showing the temperature dependence of $\sigma_T$ calculated by the above method. As shown in FIG. 7, $\sigma_T$ of the garnet-type compound obtained in Example 1 was $1\times10^{-4}$ S/cm at room temperature (30° C.). The activation energy (Ea) for conduction calculated using Arrhenius' equation was 32 kJ(s)/mol.

Since the $\sigma_T$ and Ea values obtained above are at the same levels as the characteristics of LLZ garnet-type compounds reported previously, the garnet-type compound of Example 1, which was obtained by being subjected to the first and second steps, was found to have high lithium ion conductivity. Accordingly, the garnet-type compound produced through the first and second steps is a material suitable for use in application to all-solid lithium secondary batteries.

By sintering the thus obtained garnet-type compound and using the sintered product for forming a solid electrolyte layer, an all-solid lithium secondary battery with high performance based on high lithium ion conductivity can be provided. As described above, the garnet-type compound is in the form of fine particles. Therefore, upon application to all-solid lithium secondary batteries, using the garnet-type compound as an ion conduction aid for forming an electrode layer of a positive electrode or a negative electrode is advantageous in that it ensures a sufficient contact interface with an electrode active material in the form of particles. This contributes to increase the utilization rate of the electrode active material, and can thus be an important factor for constructing a battery with a high energy density. Therefore, the garnet-type compounds obtained in the Examples can be considered to be excellent battery materials.

Consideration of Productivity

The following is a comparison of the productivity of the production method performed in the above Examples with the productivity of conventional techniques. In the production of an LLZ garnet-type compound by a conventional solid-phase reaction method, it is necessary to perform final firing for obtaining the desired compound at a high temperature of 1,000° C. or more. In this process, to avoid an excessive loss of lithium by firing, the sample is covered with a powder having the same composition as the sample. In contrast, in the production method shown in the Examples, the final firing temperatures were 800 to 900° C., which are all less than 1,000° C., and a substantially single phase of an LLZ garnet-type compound was successfully obtained from the total amount of the powder used for firing.

Further, as other conventional techniques, for example, a production method using a metal alkoxide as a raw material, which is known to provide an LLZ garnet-type compound at a lower temperature, requires using a large amount of organic solvent in the production steps. In contrast, the method of the present invention, which requires no organic solvents, is advantageous from the standpoints of manufacturing costs and environmental impact. Further, in the manufacturing method using the conventional and ordinary neutralization-coprecipitation method, an excess of Li is used as a raw material at a Li/La molar ratio of about 3.0 to 5.0. In contrast, according to the production methods shown in the Examples, this ratio is as small as about 2.0. Thus, the production methods shown in the Examples are advantageous in that Li resources, which are relatively expensive and are likely to have the risk of resource shortage, can be saved.

The above results of the Examples clearly show that the production method for producing an LLZ garnet-type compound according to the present invention is superior to the conventional method in productivity.

INDUSTRIAL APPLICABILITY

The garnet-type compound obtained by the production method of the present invention can be used for any application using lithium ion conductivity, such as secondary batteries, fuel cells, and gas sensors. The garnet-type compound is particularly suitable for use for all-solid-state lithium secondary batteries, which are a type of secondary batteries.

The invention claimed is:

1. A method for producing a garnet-type compound, the method comprising:
   (1) a first step of mixing a first raw material and a second raw material to obtain a precipitate, the first raw material being a solution comprising a zirconium carbonate complex and having a pH of at least 7.0 and not more than 9.5, the second raw material comprising a compound containing the above element $M^1$ as a constituent element; and
   (2) a second step of mixing the precipitate and a third raw material to obtain a mixture, the third raw material containing Li as a constituent element, and then firing the mixture at a temperature of less than 1,000° C. to obtain a fired product,
the first raw material being a solution prepared in such a manner that the molar ratio of carbonate species to zirconium species:
   (number of moles of carbonate species)/(number of moles of zirconium species) is in the range of 1.5 or more to 15.0 or less,
   at least one of counter ions of the zirconium carbonate complex being $NR_4^+$ wherein each R independently represents at least one substituent selected from the group consisting of H, $CH_3$, and $CH_2CH_2OH$,
   wherein the garnet-type is defined as a compound comprising Zr, Li, and element $M^1$, wherein $M^1$ is at least one element selected from the group consisting of La, Sc, Y, and Ce, and having a crystal structure classified into a cubic system, space group Ia-3d.

2. The method for producing a garnet-type compound according to claim 1, wherein at least one of the first raw material and the second raw material contain at least one of element $M^2$, wherein element $M^2$ is at least one element selected from the group consisting of B, Al, Si, P, and Ge and element $M^3$, wherein $M^3$ is at least one element selected from the group consisting of Hf, Nb, and Ta,
   the element $M^1$ being present at a molar ratio to Zr in the first raw material:
      (number of moles of $M^1$)/(number of moles of Zr) of 1 or more and 2 or less,
   the element $M^2$ being present at a molar ratio to Zr in the first raw material
      (number of moles of $M^2$)/(number of moles of Zr) of 0 or more and 0.8 or less, and
   the element $M^3$ being present at a molar ratio to Zr in the first raw material:
      (number of moles of $M^3$)/(number of moles of Zr) of 0 or more and 0.5 or less.

3. The method for producing a garnet-type compound according to claim 1, wherein in the first step, the precipitate is heated at a temperature of 80° C. or more.

4. The method for producing a garnet-type compound according to claim 1, wherein the mixture in the second step is obtained by dispersing the precipitate in a solution containing the third raw material to prepare a dispersion and then evaporating the dispersion to dryness.

5. The method for producing a garnet-type compound according to claim 1, wherein the compound containing Li as a constituent element is at least one compound selected from the group consisting of oxides, hydroxides, chlorides, carbonates, nitrates, sulfates, and organic acid salts of Li, and the mixture in the second step is obtained by dry blending.

* * * * *